US012711159B1

(12) United States Patent
Gibson

(10) Patent No.: US 12,711,159 B1
(45) Date of Patent: Aug. 18, 2026

(54) APPARATUS AND METHOD FOR AUTOMATED GENERATION OF MACHINE LEARNING OUTPUTS FOR LONGITUDINAL DATASETS

(71) Applicant: Hurree Labs, Inc., Boca Raton, FL (US)

(72) Inventor: Aaron Gibson, Belfast (IE)

(73) Assignee: Hurree Labs, Inc., Boca Raton, FL (US)

( * ) Notice: Subject to any disclaimer, the term of this patent is extended or adjusted under 35 U.S.C. 154(b) by 0 days.

(21) Appl. No.: 19/300,404

(22) Filed: Aug. 14, 2025

(51) Int. Cl.

| | |
|---|---|
| ***G06F 16/28*** | (2019.01) |
| ***G05B 13/02*** | (2006.01) |
| ***G06F 9/451*** | (2018.01) |

(52) U.S. Cl.
CPC ....... *G06F 16/287* (2019.01); *G05B 13/0265* (2013.01); *G06F 9/451* (2018.02)

(58) Field of Classification Search
CPC .... G06F 16/287; G06F 9/451; G05B 13/0265
USPC .......................................................... 707/739
See application file for complete search history.

(56) References Cited

U.S. PATENT DOCUMENTS

| | | | | |
|---|---|---|---|---|
| 2020/0134640 | A1 | 4/2020 | Morgan et al. | |
| 2022/0238231 | A1* | 7/2022 | El Emam | G06N 3/08 |
| 2022/0261425 | A1* | 8/2022 | Patil | G06F 16/1873 |
| 2024/0281723 | A1 | 8/2024 | Kaleem et al. | |

FOREIGN PATENT DOCUMENTS

| | | | |
|---|---|---|---|
| IN | 202141037180 | A | 2/2023 |
| IN | 202504104325 | A1 | 5/2025 |

* cited by examiner

*Primary Examiner* — Cam Y T Truong
(74) *Attorney, Agent, or Firm* — CALDWELL LLC

(57) ABSTRACT

An apparatus and method for automated generation of machine learning outputs for longitudinal datasets are disclosed. The apparatus includes at least a processor, and a memory communicatively connected to the at least a processor, wherein the memory contains instructions configuring the at least a processor to receive a plurality of longitudinal datasets, wherein the plurality of longitudinal datasets include a plurality of temporal data points, generate a machine learning output as a function of the plurality of longitudinal datasets using a plurality of output machine-learning models that have been trained on one or more output training datasets including exemplary longitudinal datasets correlated to exemplary machine learning outputs, generate and execute a control command as a function of the machine learning output and modify a graphical user interface as a function of the machine learning output.

18 Claims, 7 Drawing Sheets

APPARATUS AND METHOD FOR AUTOMATED GENERATION OF MACHINE LEARNING OUTPUTS FOR LONGITUDINAL DATASETS

FIELD OF THE INVENTION

The present invention generally relates to the field of machine learning. In particular, the present invention is directed to an apparatus and method for automated generation of machine learning outputs for longitudinal datasets.

BACKGROUND

Machine learning techniques have improved forecasting accuracy by enabling systems to learn from historical data and make data-driven predictions. However, most implementations rely on uniform model application and static analytical configurations that do not account for varying data characteristics. Accordingly, there exists a need for an improved system and method that enables adaptive and model-driven forecasting.

SUMMARY OF THE DISCLOSURE

In some aspects, the techniques described herein relate to an apparatus for automated generation of machine learning outputs for longitudinal datasets, the apparatus including at least a processor, and a memory communicatively connected to the at least a processor, wherein the memory contains instructions configuring the at least a processor to receive a plurality of longitudinal datasets, wherein the plurality of longitudinal datasets include a plurality of temporal data points, generate a machine learning output as a function of the plurality of longitudinal datasets using a plurality of output machine-learning models that have been trained on one or more output training datasets including exemplary longitudinal datasets correlated to exemplary machine learning outputs, generate and execute a control command as a function of the machine learning output, wherein executing the control command includes selectively increasing an analysis frequency upon detecting a positive machine learning output, and selectively decreasing the analysis frequency upon detecting a negative machine learning output, and modify a graphical user interface as a function of the machine learning output.

In some aspects, the techniques described herein relate to a method for automated generation of machine learning outputs for longitudinal datasets, the method including receiving, using at least a processor, a plurality of longitudinal datasets, wherein the plurality of longitudinal datasets include a plurality of temporal data points, generating, using the at least a processor, a machine learning output as a function of the plurality of longitudinal datasets using a plurality of output machine-learning models that have been trained on one or more output training datasets including exemplary longitudinal datasets correlated to exemplary machine learning outputs, generating and executing, using the at least a processor, a control command as a function of the machine learning output, wherein executing the control command includes selectively increasing an analysis frequency upon detecting a positive machine learning output, and selectively decreasing the analysis frequency upon detecting a negative machine learning output, and modifying, using the at least a processor, a graphical user interface as a function of the machine learning output.

These and other aspects and features of non-limiting embodiments of the present invention will become apparent to those skilled in the art upon review of the following description of specific non-limiting embodiments of the invention in conjunction with the accompanying drawings.

BRIEF DESCRIPTION OF THE DRAWINGS

For the purpose of illustrating the invention, the drawings show aspects of one or more embodiments of the invention. However, it should be understood that the present invention is not limited to the precise arrangements and instrumentalities shown in the drawings, wherein.

The drawings are not necessarily to scale and may be illustrated by phantom lines, diagrammatic representations and fragmentary views. In certain instances, details that are not necessary for an understanding of the embodiments or that render other details difficult to perceive may have been omitted.

DETAILED DESCRIPTION

At a high level, aspects of the present disclosure are directed to systems and methods for automated generation of machine learning outputs for longitudinal datasets. The apparatus includes at least a processor, and a memory communicatively connected to the at least a processor, wherein the memory contains instructions configuring the at least a processor to receive a plurality of longitudinal datasets, wherein the plurality of longitudinal datasets include a plurality of temporal data points, generate a machine learning output as a function of the plurality of longitudinal datasets using a plurality of output machine-learning models that have been trained on one or more output training datasets including exemplary longitudinal datasets correlated to exemplary machine learning outputs, generate and execute a control command as a function of the machine learning output, wherein executing the control command includes selectively increasing an analysis frequency upon detecting a positive machine learning output, and selectively decreasing the analysis frequency upon detecting a negative machine learning output, and modify a graphical user interface as a function of the machine learning output.

Aspects of the present disclosure allow for enhancing the accuracy and efficiency of decision-making processes. By leveraging an output machine-learning model, an apparatus may automatically process, analyze, and interpret large volumes of data, reducing the time and resources required for manual analysis and improving the overall efficiency of the technical process. The use of an output machine-learning model may enable analyzing data and making decisions in real-time or near real-time, allowing an apparatus to respond quickly to changing conditions or dynamic environments.

Exemplary embodiments illustrating aspects of the present disclosure are described below in the context of several specific examples.

Figure 1:
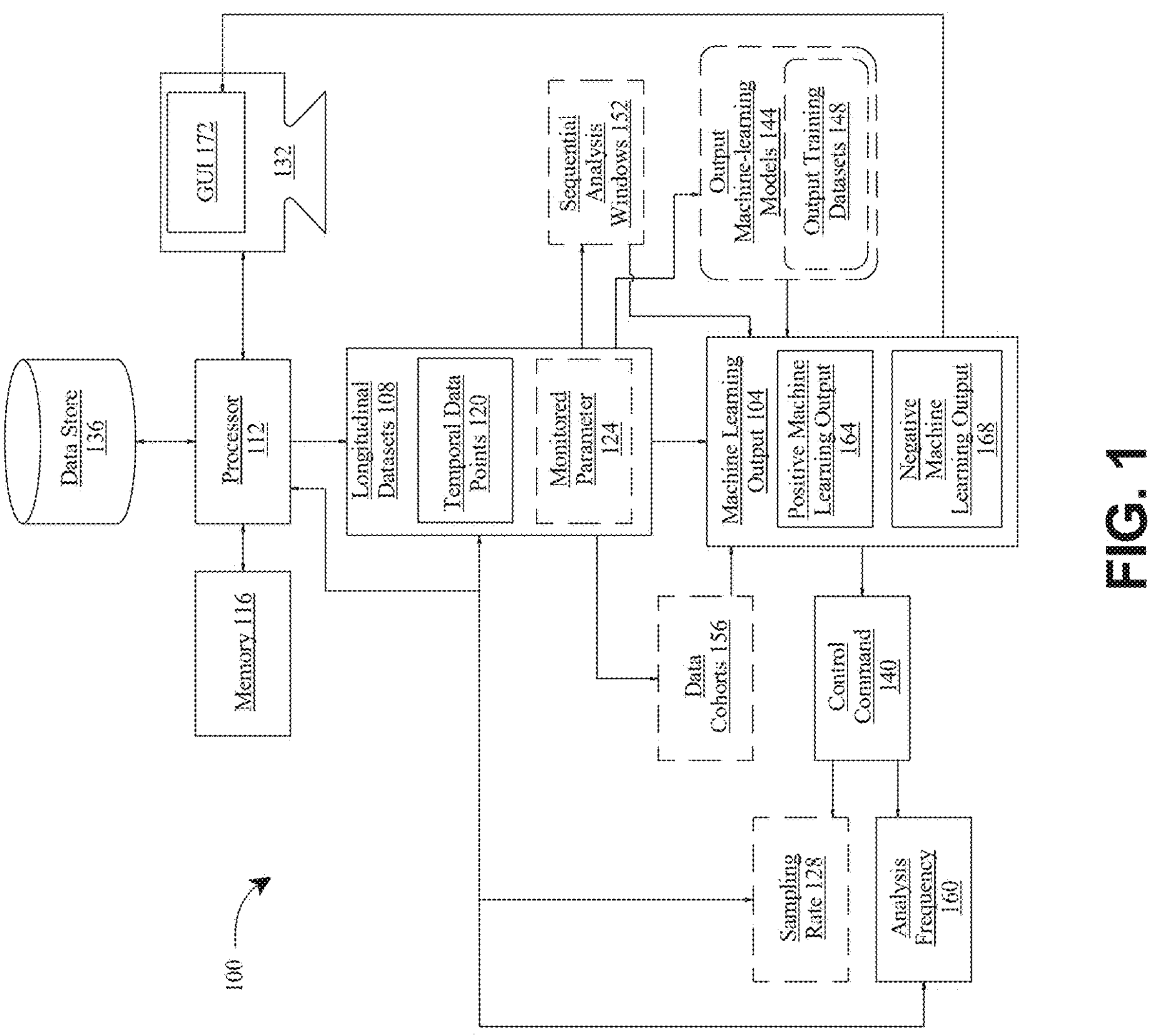
FIG. 1 illustrates a block diagram of an exemplary apparatus for automated generation of machine learning outputs for longitudinal datasets.

Referring now to FIG. 1, an exemplary embodiment of apparatus 100 for automated generation of machine learning outputs 104 for longitudinal datasets 108 is illustrated. The machine learning outputs 104 and longitudinal datasets 108 are further described in detail below. Apparatus 100 may include circuitry such as without limitation a processor 112 communicatively connected to a memory 116; for instance, circuitry may include and/or be included in a computing device. Processor 112 may include any computing device as described in this disclosure, including without limitation a microcontroller, microprocessor, digital signal processor (DSP) and/or system on a chip (SoC) as described in this disclosure. Processor 112 may include, be included in, and/or communicate with a mobile device such as a mobile telephone or smartphone. Processor 112 may include a single computing device operating independently, or may include two or more computing device operating in concert, in parallel, sequentially or the like; two or more computing devices may be included together in a single computing device or in two or more computing devices. Processor 112 may interface or communicate with one or more additional devices as described below in further detail via a network interface device. Network interface device may be utilized for connecting processor 112 to one or more of a variety of networks, and one or more devices. Examples of a network interface device include, but are not limited to, a network interface card (e.g., a mobile network interface card, a LAN card), a modem, and any combination thereof. Examples of a network include, but are not limited to, a wide area network (e.g., the Internet, an enterprise network), a local area network (e.g., a network associated with an office, a building, a campus or other relatively small geographic space), a telephone network, a data network associated with a telephone/voice provider (e.g., a mobile communications provider data and/or voice network), a direct connection between two computing devices, and any combinations thereof. A network may employ a wired and/or a wireless mode of communication. In general, any network topology may be used. Information (e.g., data, software etc.) may be communicated to and/or from a computer and/or a computing device. Processor 112 may include but is not limited to, for example, a computing device or cluster of computing devices in a first location and a second computing device or cluster of computing devices in a second location. Processor 112 may include one or more computing devices dedicated to data storage, security, distribution of traffic for load balancing, and the like. Processor 112 may distribute one or more computing tasks as described below across a plurality of computing devices of computing device, which may operate in parallel, in series, redundantly, or in any other manner used for distribution of tasks or memory between computing devices. Processor 112 may be implemented, as a non-limiting example, using a "shared nothing" architecture.

With continued reference to FIG. 1, as used in this disclosure, "communicatively connected" means connected by way of a connection, attachment, or linkage between two or more relata such as without limitation electronic components, modules, and/or devices which allows for reception and/or transmittance of information therebetween. For example, and without limitation, this connection may be wired or wireless, direct or indirect, and between two or more components, circuits, devices, systems, and the like, which allows for reception and/or transmittance of data and/or signal(s) therebetween. Data and/or signals there between may include, without limitation, electrical, electromagnetic, magnetic, video, audio, radio and microwave data and/or signals, combinations thereof, and the like, among others. A communicative connection may be achieved, for example and without limitation, through wired or wireless electronic, digital or analog, communication, either directly or by way of one or more intervening devices or components. Further, communicative connection may include electrically coupling or connecting at least an output of one device, component, or circuit to at least an input of another device, component, or circuit. For example, and without limitation, via a bus or other facility for intercommunication between elements of a computing device. Communicative connecting may also include indirect connections via, for example and without limitation, wireless connection, radio communication, low power wide area network, optical communication, magnetic, capacitive, or optical coupling, and the like. In some instances, the terminology "communicatively coupled" may be used in place of communicatively connected in this disclosure.

With continued reference to FIG. 1, circuitry may alternatively or additionally be implemented by configuring a hardware device such as a combinatorial or sequential logic circuit, an application-specific integrated circuit (ASIC), a field-programmable gate array (FPGA), or other hardware unit; memory may be attached thereto to further configure the hardware unit using read-only memory (ROM) or any other static or writable memory as described in this disclosure. Alternatively or additionally, hardware units and/or modules may be combined with and/or in communication with a processor, such as without limitation in a system-on-chip architecture wherein some functions are configured by modification or design of hardware circuitry, such as without limitation FPGA circuitry, while others are configured in the form of instructions in memory for one or more processors. As a non-limiting example, any step or combination of steps described herein may be performed entirely using hardware circuit configured to perform such steps either with static memory or rewritable memory. Such steps or combinations of steps may include signing with a digital signature, cryptographically hashing, evaluation of zero-knowledge proofs, or any other specific process described in this disclosure.

With continued reference to FIG. 1, processor 112 may be designed and/or configured to perform any method, method step, or sequence of method steps in any embodiment described in this disclosure, in any order and with any degree of repetition. For instance, processor 112 may be configured to perform a single step or sequence repeatedly until a desired or commanded outcome is achieved; repetition of a step or a sequence of steps may be performed iteratively and/or recursively using outputs of previous repetitions as inputs to subsequent repetitions, aggregating inputs and/or outputs of repetitions to produce an aggregate result, reduction or decrement of one or more variables such as global variables, and/or division of a larger processing task into a set of iteratively addressed smaller processing tasks. Processor 112 may perform any step or sequence of steps as described in this disclosure in parallel, such as simultaneously and/or substantially simultaneously performing a step two or more times using two or more parallel threads, processor cores, or the like; division of tasks between parallel threads and/or processes may be performed according to any protocol suitable for division of tasks between iterations. Persons skilled in the art, upon reviewing the entirety of this disclosure, will be aware of various ways in which steps, sequences of steps, processing tasks, and/or data may be subdivided, shared, or otherwise dealt with using iteration, recursion, and/or parallel processing.

With continued reference to FIG. 1, memory 116 contains instructions configuring processor 112 to receive a plurality of longitudinal datasets 108. For the purposes of this disclosure, a "longitudinal dataset" is a collection of temporal data points that represent repeated observations or measurements of one or more monitored parameters over a sequence of time intervals. In some cases, each longitudinal dataset 108 may be characterized by its temporal continuity, wherein temporal data points 120 may be organized according to their respective timestamps. In some cases, each longitudinal dataset 108 may capture occurrence, behavior, and the like of monitored parameter 124 across a defined observation period. For instance, and without limitation, longitudinal dataset 108 may include a collection of website traffic that records a number of daily visitors over a period of months. For instance, and without limitation, longitudinal dataset 108 may include a collection of open rates, click-through rates, and conversions for an email campaign over weekly intervals.

With continued reference to FIG. 1, a plurality of longitudinal datasets 108 includes a plurality of temporal data points 120. For the purposes of this disclosure, a "temporal data point" is an individual unit of data of observation or measurement associated with a monitored parameter. In some cases, temporal data point 120 may include a recorded value associated with a monitored parameter 124 and a corresponding timestamp that defines the exact moment or interval during which the value was obtained. For the purposes of this disclosure, a "timestamp" is a temporal identifier associated with a temporal data point. In some cases, timestamp of temporal data point 120 may denote a specific point in time at which the temporal data point 120 was generated, recorded, or observed. In some cases, timestamp may be expressed in various formats, including but not limited to absolute time representations such as Coordinated Universal Time (UTC), epoch time (e.g., milliseconds since Jan. 1, 1970), or structured date-time formats. In some cases, timestamp may serve as a temporal anchor that situates each temporal data point 120 within a chronological sequence, enabling a construction of longitudinal datasets 108.

With continued reference to FIG. 1, for the purposes of this disclosure, a "monitored parameter" is a quantifiable variable or condition that is subject to ongoing observation, measurement, or tracking over time within a defined system, process, or environment. In some cases, monitored parameter 124 may represent any metric or feature of interest whose temporal behavior is relevant to the objectives of forecasting, analysis, or automated control. As a non-limiting example, monitored parameters 124 may include user engagement actions such as website visits, social media interactions, application performance indicators such as latency or click-through rate (CTR) utilization, or business metrics such as conversion rates or customer retention figures. As a non-limiting example, a monitored parameter 124 may include a number of "likes" or "shares" a post receives in social media.

With continued reference to FIG. 1, for example, and without limitation, when a user visits a website (monitored parameter 124), processor 112 may receive one temporal data point 120. The temporal data point 120 in this instance may include a timestamp indicating when the visit occurred, along with associated engagement data such as session duration or entry source. A collection of the user visiting the website over a period of time would constitute one longitudinal dataset 108 having multiple temporal data points 120, each representing a discrete website visit or interaction event captured at successive time intervals. Similarly, when a user likes a post on social media (another monitored parameter 124), processor 112 may receive one temporal data point 120 reflecting that interaction. A series of such likes occurring over time, whether in response to different posts or recurring engagement with the same content stream, would collectively form one longitudinal dataset 108 having multiple temporal data points 120. Each dataset, while corresponding to a distinct monitored parameter 124, maintains the temporal continuity and data granularity necessary for sequential modeling, anomaly detection, and trend analysis within the disclosed forecasting apparatus.

With continued reference to FIG. 1, in some cases, processor 112 may receive longitudinal datasets 108 or temporal data points 120 from application programming interfaces (APIs), streaming data platforms, message queues, database connectors, direct sensor inputs, and the like. For example, and without limitation, processor 112 may initiate a scheduled data pull (e.g., at sampling rate 128) from a RESTful API that returns a JSON payload containing multiple entries, each entry including a timestamp field and a corresponding value for a monitored parameter 124. For example, and without limitation, processor 112 may subscribe to a publish-subscribe messaging system where each message includes a temporal data point 120 that is pushed to the system in real time. Upon receipt, in some cases, processor 112 may parse the incoming payloads or messages to extract relevant fields, validate the format of timestamps, and standardize them to a unified time base if necessary. In some embodiments, time zone normalization or timestamp reformatting may be applied to ensure consistency across heterogeneous data sources. In some embodiments, extracted temporal data points 120 may be then organized in temporal order and stored in volatile or persistent memory structures, such as arrays, time-series databases, or in-memory data frames, forming one or more longitudinal datasets 108.

With continued reference to FIG. 1, in some cases, processor 112 may receive longitudinal datasets 108 or temporal data points 120 using an API. As used in the current disclosure, an "application programming interface" is a software interface for two or more computer programs to communicate with each other. An application programming interface may be a type of software interface, offering a service to other pieces of software. In contrast to a user interface, which connects a computer to a person, an API may connect computers or pieces of software to each other. An API may not be intended to be used directly by a person other than a computer programmer who is incorporating it into the software. An API may be made up of different parts which act as tools or services that are available to the programmer. A program or a programmer that uses one of these parts is said to call that portion of the API. The calls that make up the API are also known as subroutines, methods, requests, or endpoints. An API specification may define these calls, meaning that it explains how to use or implement them. One purpose of API may be to hide the internal details of how a system works, exposing only those parts a programmer will find useful and keeping them consistent even if the internal details later change. An API may be custom-built for a particular pair of systems, or it may be a shared standard allowing interoperability among many systems. The term API may be often used to refer to web APIs, which allow communication between computers that are joined by the internet. API may be configured to query for web applications in order to retrieve longitudinal datasets 108 or temporal data points 120 to another web application, data database, insurance provider database, creditor database, medical center patient portal, and the like. An API may be further configured to filter through web applications according to a filter criterion. In this disclosure, "filter criteria" are conditions the web applications must fulfill in order to qualify for API. Web applications may be filtered based on these filter criteria. Filter criteria may include, without limitation, monitored parameter 124, and the like.

With continued reference to FIG. 1, processor 112 may receive longitudinal datasets 108 or temporal data points 120 from social media. For the purposes of this disclosure, a "social media" is a content sharing platform. As a non-limiting example, social media may include Google®, Instagram®, Facebook®, LinkedIn®, TikTok®, and any social media thereof. In some embodiments, processor 112 may obtain longitudinal datasets 108 or temporal data points 120 using cookies. For the purposes of this disclosure, "cookies" are small text files stored on a device that contain information about their browsing activities. As a non-limiting example, longitudinal datasets 108 or temporal data points 120 can be obtained by leveraging cookies that track user interactions on a web page or application. For example, and without limitation, when user visits a website or uses an online service, cookies may capture and store data. In a non-limiting example, cookies may capture and store the timestamp of user's visit, the duration of user's session, the specific pages user accessed, or the like. This information may be used to calculate and estimate longitudinal datasets 108 or temporal data points 120 on different activities or sections of a website.

With continued reference to FIG. 1, in some embodiments, processor 112 may receive longitudinal datasets 108 or temporal data points 120 from a downstream device 132. For the purposes of this disclosure, a "downstream device" is a device, system or endpoint capable of receiving data transmitted by a processor 112. As a non-limiting example, downstream device 132 may include smartphones, tablets, desktop computers, laptop computers, smartwatches, calendar interfaces, or any endpoint system. In some embodiments, downstream device 132 may include an interface configured to receive inputs from a user. In some embodiments, a user may manually input any data into apparatus 100 using downstream device 132. In some embodiments, a user may have a capability to process, store or transmit any information independently.

With continued reference to FIG. 1, in some embodiments, processor 112 may receive longitudinal datasets 108 or temporal data points 120 from a data store 136. As used in this disclosure, a "data store" is a data structure configured to store data associated with longitudinal datasets. As a non-limiting example, data store 136 may store longitudinal datasets 108, temporal data points 120, monitored parameter 124, machine learning output 104, control command 140, historical data, and the like. In one or more embodiments, data store 136 may include inputted or calculated information and datum related to a longitudinal datasets 108 or temporal data points 120. In some embodiments, a datum history may be stored in data store 136. As a non-limiting example, the datum history may include real-time and/or previous inputted data related to a longitudinal datasets 108 or temporal data points 120. As a non-limiting example, data store 136 may include instructions from a user, who may be an expert user, a past user in embodiments disclosed herein, or the like, where the instructions may include examples of the data related to longitudinal datasets 108 or temporal data points 120.

With continued reference to FIG. 1, in some embodiments, processor 112 may be communicatively connected with data store 136. For example, and without limitation, in some cases, data store 136 may be local to processor 112. In another example, and without limitation, data store 136 may be remote to processor 112 and communicative with processor 112 by a way of one or more networks. The network may include, but is not limited to, a cloud network, a mesh network, and the like. By way of example, a "cloud-based" system can refer to a system which includes software and/or data which is stored, managed, and/or processed on a network of remote servers hosted in the "cloud," e.g., via the Internet, rather than on local severs or personal computers. A "mesh network" as used in this disclosure is a local network topology in which the infrastructure processor 112 connects directly, dynamically, and non-hierarchically to as many other computing devices as possible. A "network topology" as used in this disclosure is an arrangement of elements of a communication network.

With continued reference to FIG. 1, in some embodiments, data store 136 may be implemented, without limitation, as a relational database, a key-value retrieval database such as a NOSQL database, or any other format or structure for use as a database that a person skilled in the art would recognize as suitable upon review of the entirety of this disclosure. Database may alternatively or additionally be implemented using a distributed data storage protocol and/or data structure, such as a distributed hash table or the like. Database may include a plurality of data entries and/or records as described above. Data entries in a database may be flagged with or linked to one or more additional elements of information, which may be reflected in data entry cells and/or in linked tables such as tables related by one or more indices in a relational database. Persons skilled in the art, upon reviewing the entirety of this disclosure, will be aware of various ways in which data entries in a database may store, retrieve, organize, and/or reflect data and/or records as used herein, as well as categories and/or populations of data consistently with this disclosure.

With continued reference to FIG. 1, receiving a plurality of longitudinal datasets 108 may include temporally aligning the plurality of longitudinal datasets 108 to a common time base, wherein a plurality of output machine-learning models 144 may be configured to receive input data aligned to the common time base. For the purposes of this disclosure, a "common time base" is a standardized temporal framework to which multiple temporal data points or longitudinal datasets are aligned. In some cases, common time base may define a unified set of temporal intervals, units, or reference points, such as a fixed sampling rate, universal timestamp format, or global epoch, which allows apparatus 100 to process temporally distributed data in a coherent and analytically meaningful manner. As a non-limiting example, common time base may include a continuous sequence of time slots with fixed durations (e.g., one-minute, hourly, or daily intervals) or as a variable structure based on domain-specific events or system triggers. In some cases, common time base may serve as a temporal reference against which all incoming temporal data points 120 are mapped, either through direct alignment or interpolation, to account for variations in sampling rates 128, time zones, clock drift, or asynchronous data generation. In some cases, processor 112 may extract timestamp associated with each temporal data point 120 from longitudinal datasets 108. These timestamps may be expressed in varying formats, granularities, or time zones, depending on the source systems. For the purposes of this disclosure, "temporal alignment" refers to a process by which time-stamped data points are adjusted, mapped, or normalized so that each data point corresponds to a consistent and unified time structure. Temporal alignment may be configured to synchronize data originating from heterogeneous sources, potentially collected at different sampling rates, formats, or time zones, to enable coherent and accurate time-series analysis. In some cases, temporal alignment of input data for output machine-learning models 144 may help downstream feature extraction by ensuring that temporal data points 120 from longitudinal datasets 108 are synchronized to a common time base, allowing for consistent and meaningful computation of time-dependent features. In some cases, processor 112 may first standardize these timestamps into a unified format by applying conversion rules and time zone adjustments. This standardization enables consistent comparison and temporal matching across datasets. Following timestamp normalization, the processor 112 may map each temporal data point 120 to a predefined set of discrete temporal intervals defined by a common time base. This may include rounding, binning, or resampling operations in which temporal data points 120 are assigned to fixed-length time windows (e.g., one-minute, five-minute, hourly) based on their normalized timestamps. In some cases, if two or more longitudinal datasets 108 contain temporal data points 120 for the same time window, processor 112 may aggregate the values using statistical functions such as mean, sum, median, or weighted average, depending on application requirements. In cases where one longitudinal dataset 108 contains temporal data points 120 at higher frequency than others, or when some time intervals are missing data in certain datasets, processor 112 may interpolate missing values using linear interpolation, forward-fill, backward-fill, or model-based estimation techniques to maintain temporal continuity. Once the alignment is complete, in some cases, processor 112 may store the aligned longitudinal datasets 108 in memory structures indexed by a common time base, allowing downstream components or processes to perform cross-dataset operations such as correlation analysis, multivariate forecasting, or concurrent anomaly detection with temporal consistency.

With continued reference to FIG. 1, memory 116 contains instructions configuring processor 112 to generate a machine learning output 104 as a function of a plurality of longitudinal datasets 108 using a plurality of output machine-learning models 144 that have been trained on one or more output training datasets 148 including exemplary longitudinal datasets correlated to exemplary machine learning outputs. For the purposes of this disclosure, a "machine learning output" is a computed result that represents an inference derived from a longitudinal dataset. In some cases, machine learning output 104 may take a form of a predicted value, classification label, regression score, anomaly, pattern (e.g., temporal pattern), probability distribution, cluster assignment, and the like. As a non-limiting example, a machine learning output 104 may include a predicted website traffic value for a future time interval, such as an estimate that 15,000 users will visit a website in the next 24 hours based on analysis of prior longitudinal datasets 108. In another non-limiting example, a machine learning output 104 may be an anomaly score indicating the presence of statistically irregular behavior in user engagement. For instance, and without limitation, if a social media platform observes an unexpected drop in the daily number of post likes, processor 112 may generate a machine learning output 104 that includes a classification label such as "anomalous" along with a confidence value reflecting the likelihood that the observed behavior deviates significantly from historical norms. In another non-limiting example, a machine learning output 104 may include a binary signal used for control logic, such as a "positive" forecast indicating upward movement in customer conversion rates. In some cases, machine learning output 104 may be stored in data store 136. In some cases, processor 112 may retrieve machine learning output 104 from data store 136. In some cases, a user may manually input machine learning output 104.

With continued reference to FIG. 1, for the purposes of this disclosure, a "temporal pattern" is a temporal behavior that emerges from temporal data points within a longitudinal dataset. In some cases, temporal patterns may include periodic fluctuations, long-term trends, recurring sequences, or correlated temporal events that persist across consecutive time intervals. As a non-limiting example, temporal patterns may include diurnal cycles in web traffic, seasonal variations in consumer behavior, gradual increases in system load, or regularly spaced peaks in social media engagement. In some embodiments, processor 112 may identify a temporal pattern within the plurality of longitudinal datasets 108 by detecting directional changes across sequences of temporal data points 120 and evaluating the directional changes to infer structured, non-random behavior over time. For each dataset, in some cases, processor 112 may compute a directional change between successive temporal data points 120 by applying a differencing operation, such as computing the first-order difference $\Delta_t = v_t - v_{t-1}$, where $v_t$ represents a value of monitored parameter 124 at time t. This operation may transform each dataset into a new sequence representing the direction and magnitude of change over time. The processor 112 may then analyze these directional sequences to detect consistent or statistically significant patterns, such as persistent positive or negative trends (e.g., consecutive increases or decreases), repeating fluctuations (e.g., sinusoidal or seasonal cycles), or directional inflection points (e.g., changes from increasing to decreasing behavior). In some cases, processor 112 may perform moving average analysis, slope estimation using linear regression over sliding windows (e.g., sequential analysis windows 152), frequency domain analysis via Fast Fourier Transform (FFT), or pattern matching techniques using predefined directional templates.

With continued reference to FIG. 1, in some cases, generating machine learning output 104 may include identifying at least an anomaly within a plurality of longitudinal datasets 108 as a function of historical data, detecting a monitored parameter 124 associated with the at least an anomaly and generating and executing control command 140 as a function of the monitored parameter 124, wherein the control command 140 may be configured to modify a sampling rate 128 of at least one of the plurality of longitudinal datasets 108 associated with the monitored parameter 124, wherein executing the control command 140 may include disabling data sampling from a data source associated with the at least one of the plurality of longitudinal datasets 108. For the purposes of this disclosure, an "anomaly" is a data point or set of data points within a longitudinal dataset that deviates significantly from an expected temporal pattern, statistical distribution, or learned baseline behavior of monitored parameter. As a non-limiting example, anomalies may include point anomalies (a single unexpected event), contextual anomalies (events that are unusual in a specific temporal or situational context), or collective anomalies (sequences of data points that, in combination, represent abnormal behavior). For example, and without limitation, anomalies may include a sudden drop in website traffic, an unexpected spike in server response time, or a pattern of user disengagement that does not align with historical norms. In some embodiments, processor 112 may identify at least an anomaly within a plurality of longitudinal datasets 108 by executing an analytical sequence that compares newly received or current temporal data points 120 against statistically or model-defined expectations derived from historical data stored in memory 116 or data store 136. In some cases, processor 112 may generate a baseline model of normal behavior using historical longitudinal datasets and then assess deviations of current observations relative to that baseline. For the purposes of this disclosure, "historical data" is a collection of previously recorded time-stamped data points associated with one or more monitored parameters. In some cases, each data point of historical data may reflect an observation, measurement, or system state captured at a known point in time prior to a current operating interval. In some cases, historical data may be retrieved from data store 136. In some cases, processor 112 may align historical longitudinal datasets to a common time base and segmenting them into sequential analysis windows 152 that correspond to consistent time intervals, such as hourly, daily, or weekly segments. Within each sequential analysis window 152, processor 112 may compute statistical descriptors including but not limited to the mean, standard deviation, confidence intervals, percentiles, and seasonal trends of monitored parameter 124. Continuing the non-limiting example, processor 112 may receive a new set of temporal data points 120 and compute the same statistical metrics within a corresponding current sequential analysis window 152. The processor 112 may then compare these current metrics against historical baseline. In a non-limiting example, anomaly may be detected if the current value, or a series of values, falls outside a pre-defined confidence band (e.g., ±3 standard deviations from the historical mean) or violates a statistical threshold derived from past observations. In some embodiments, the processor 112 may employ control charts, z-score analysis, or robust statistical techniques such as median absolute deviation to quantify deviations from the baseline. In some cases, processor 112 may use a trained output machine-learning model 144 specifically configured for anomaly detection. The output machine-learning model 144 may be trained on an output training dataset 148 composed of labeled historical sequences categorized as "normal" or "anomalous." The processor 112 may feed temporal data points 120 into the output machine-learning model 144, which may then output an anomaly score or binary classification indicating whether the observed data conforms to historical patterns.

With continued reference to FIG. 1, following anomaly identification, processor 112 may detect a specific monitored parameter 124 associated with the anomaly. In some cases, processor 112 may extract metadata or dataset identifiers associated with monitored parameter 124 from longitudinal dataset 108 that is classified as anomaly. As a function of the detected anomaly and its associated monitored parameter 124, processor 112 may generate a control command 140 configured to modify a sampling rate 128 of at least one of the longitudinal datasets 108. In some cases, processor 112 may execute control command 140 by disabling data sampling from a data source associated with the anomalous longitudinal dataset 108, adjusting a scheduler to pause polling, modifying subscription parameters, or deactivating a data stream. In some cases, processor 112 may execute control command 140 by sending a signal to a data ingestion module to reconfigure its data acquisition policy. By disabling sampling, apparatus 100 or processor 112 conserves bandwidth, processing power, and storage, while maintaining responsiveness to other monitored parameters still operating under active or anomalous conditions.

With continued reference to FIG. 1, for the purposes of this disclosure, an "output machine-learning model" is a computational model that produces a machine learning output. In some cases, output machine-learning model 144 may be configured to analyze temporal, statistical, and contextual features extracted from historical or real-time data and to generate results suitable for downstream use in forecasting, anomaly detection, cohort classification, or adaptive control. An output machine-learning model 144 may be implemented using various algorithmic architectures, including but not limited to decision tree ensembles, such as Random Forests, time-series models, such as ARIMA or SARIMA, neural networks, such as recurrent neural networks (RNNs) or temporal convolutional networks (TCNs), or hybrid architectures that combine multiple modeling strategies. For the purposes of this disclosure, an "output training dataset" is a structured collection of datasets used to train one or more output machine-learning models. In some cases, each output training dataset 148 may include a sequence of temporal data points representing historical observations of at least one monitored parameter 124, along with corresponding ground truth values, labels, or expected outcomes that output machine-learning model 144 is intended to learn and predict. In some cases, output machine-learning models 144 may include ensemble modeling techniques, including Random Forest Regression and ARIMA hybrid models, to perform time series forecasting on longitudinal datasets 108. In some cases, output machine-learning model 144 may be trained using supervised learning on historical performance indicators and may be optimized to detect patterns, seasonality, and anomalies in data. Deployment of output machine-learning model 144 may be executed through TensorFlow and served via TensorFlow Serving infrastructure, which supports high-throughput, low-latency inference.

With continued reference to FIG. 1, GPU acceleration may be used to handle large-scale prediction tasks efficiently, enabling the forecasting system to deliver near real-time output for enterprise-level data loads. In some embodiments, the use of output machine learning model 144 may improve identifying hidden patterns, correlations, or anomalies that may be difficult for humans or existing systems to detect; for instance, generating machine learning output 104 or generating and executing control command 140. This may enhance the accuracy and efficiency of decision-making processes. In another non-limiting example, output machine learning model 144 may enable the automation of tasks that would otherwise require significant manual effort or expertise. By leveraging output machine learning model 144, apparatus 100 may automatically process, analyze, and interpret large volumes of data, reducing the time and resources required for manual analysis and improving the overall efficiency of the technical process. In another non-limiting example, the use of output machine learning model 144 may enable analyzing data and making decisions in real-time or near real-time, allowing processor 112 to respond quickly to changing conditions or dynamic environments. In another non-limiting example, output machine learning model 144 may learn from historical data and generate predictive models that forecast future outcomes or trends predict events, identify potential failures or risks, optimize resource allocation, anticipate customer behavior or determine optimal solutions (e.g., generating machine learning output 104 or generating and executing control command 140). This proactive approach may enable better planning, resource management, and decision-making. These may be consistent with any machine learning model described in this disclosure.

With continued reference to FIG. 1, in some embodiments, processor 112 may be configured to generate output training datasets 148. In a non-limiting example, output training datasets 148 may include correlations between exemplary longitudinal datasets, exemplary temporal data points, exemplary data cohorts, exemplary sequential analysis windows, and exemplary machine learning outputs. In some embodiments, output training datasets 148 may be stored in data store 136. In some embodiments, output training datasets 148 may be received from one or more users, data store 136, external computing devices, and/or previous iterations of processing. As a non-limiting example, output training datasets 148 may include instructions from a user, who may be an expert user, a past user in embodiments disclosed herein, or the like, which may be stored in memory and/or stored in data store 136, where the instructions may include labeling of training examples. In some embodiments, output training datasets 148 may be updated iteratively on a feedback loop. As a non-limiting example, processor 112 may update output training datasets 148 iteratively through a feedback loop as a function of longitudinal datasets 108, temporal data points 120, data cohorts 156, sequential analysis windows 152, machine learning outputs 104, historical data, outputs of machine-learning models described in this disclosure, or the like. In some embodiments, processor 112 may be configured to generate a output machine-learning model 144. In a non-limiting example, generating output machine-learning model 144 may include training, retraining, or fine-tuning output machine-learning model 144 using output training datasets 148 or updated output training datasets 148. In some embodiments, output machine-learning model 144 may have been trained with output training datasets 148. In some embodiments, processor 112 may be configured to determine machine learning outputs 104 using output machine-learning models 144 (i.e., trained or updated output machine-learning model 144). In some embodiments, output machine-learning model 144 may receive longitudinal datasets 108, temporal data points 120, data cohorts 156, sequential analysis windows 152, or historical data as inputs and may output machine learning outputs 104 in response to the inputs. In some embodiments, output machine-learning model 144 may function differently between training time and inference time. In a non-limiting example, at training time, processor 112 may be configured to train, retrain, or fine-tune output machine-learning model 144 using output training datasets 148. During the training time, output machine-learning model 144 may learn to associate patterns within longitudinal datasets 108, temporal data points 120, data cohorts 156, sequential analysis windows 152, or historical data. In a non-limiting example, at inference time, trained output machine-learning model 144 may be configured to receive previously unseen longitudinal datasets 108, temporal data points 120, data cohorts 156, sequential analysis windows 152, or historical data and, based on the representations learned during training time, automatically output a selection of machine learning output 104. Inference may be triggered in response to a user request, system event, or automated workflow operation.

With continued reference to FIG. 1, in some embodiments, processor 112 may be configured to classify a plurality of longitudinal datasets 108 to one or more data cohorts 156 as a function of metadata of the plurality of longitudinal datasets 108. For the purposes of this disclosure, "metadata" is auxiliary or descriptive information associated with each longitudinal dataset or with individual time-stamped data points. In some cases, metadata may include information that characterizes context, origin, type, or classification of the underlying data. Metadata may include, without limitation, identifiers such as user ID, session ID, device type, platform, content category, campaign tag, geographic location, time zone, data source, or interaction type. In some cases, processor 112 may evaluate metadata against one or more predefined cohort rules, classification criteria, or similarity functions stored in memory 116 or data store 136 to classify the longitudinal datasets 108 to data cohorts 156. In some cases, longitudinal datasets 108, temporal data points 120, sequential analysis windows 152, or historical data may be classified to one or more data cohorts 156 using a cohort classifier. For the purposes of this disclosure, a "data cohort" is a subset of a larger dataset that is grouped based on one or more shared attributes, classifications, or contextual characteristics. As a non-limiting example, data cohort 156 may include user demographic, geographic region, content type, device category, behavioral profile, or temporal condition. Cohort classifier may be consistent with any classifier discussed in this disclosure. Cohort classifier may be trained on cohort training data, wherein the cohort training data may include longitudinal datasets 108, temporal data points 120, sequential analysis windows 152, or historical data correlated to data cohorts 156. In some embodiments, longitudinal datasets 108, temporal data points 120, sequential analysis windows 152, or historical data may be classified to a data cohort 156 and processor 112 may determine machine learning output 104 based on the data cohort 156 using a machine-learning module as described in detail with respect to FIG. 3 and the resulting output may be used to update output training datasets 148. In some embodiments, generating training data and training machine-learning models may be simultaneous. In some embodiments, processor 112 may generate machine learning output 104 without the use of output machine-learning model 144.

With continued reference to FIG. 1, in some cases, generating machine learning output 104 may include segmenting a plurality of longitudinal datasets 108 into a plurality of sequential analysis windows 152 as a function of timestamps within a plurality of temporal data points 120 and generating the machine learning output 104 in each of the plurality of sequential analysis windows 152. For the purposes of this disclosure, "sequential analysis windows" are temporally ordered segments into which a longitudinal dataset is partitioned. In some cases, sequential analysis window 152 may correspond to a defined time interval, such as one minute, one hour, one day, or another application-specific duration, within which all temporal data points 120 are grouped and processed independently or in relation to adjacent sequential analysis windows 152. In some cases, sequential analysis windows 152 may be non-overlapping (i.e., disjoint time intervals) or overlapping (i.e., sliding windows). In some cases, processor 112 may generate sequential analysis windows 152 by scanning a longitudinal dataset 108 and segmenting it into time-aligned partitions (sequential analysis windows 152) based on timestamp values. For example, and without limitation, if time interval for sequential analysis windows 152 is set to five minutes, a temporal data point 120 with a timestamp corresponding to 10:07 AM would be assigned to a sequential analysis window 152 covering 10:05 AM to 10:10 AM. In some cases, processor 112 may then store each sequential analysis window 152 in a memory-resident data structure, such as a time-indexed array or hash map, where the key corresponds to the start time or index, and the value may be a collection of temporal data points 120 assigned to that sequential analysis window 152. In some cases, processor 112 may assign one sequential analysis window 152 to each of a plurality of output machine-learning models 144 to generate machine learning output 104 for the assigned sequential analysis window 152.

With continued reference to FIG. 1, in some cases, generating machine learning output 104 may include selecting one output machine-learning model 144 from a plurality of output machine-learning models 144 for each of a plurality of sequential analysis windows 152, wherein each of the plurality of output machine-learning models 144 has been trained on at least one output training dataset 148 including historical data specific to a monitored parameter 124. In some cases, generating machine learning output 104 may include generating the machine learning output 104 as a function of each of the plurality of sequential analysis windows 152 and a corresponding monitored parameter 124 using the selected output machine-learning model 144. In some cases, for each sequential analysis window 152, processor 112 may evaluate selection criteria to determine the most appropriate output machine-learning model 144 to assign. As a non-limiting example, the selection criteria may include a type of monitored parameter 124 of sequential analysis window 152, metadata associated with the sequential analysis window 152 (such as time of day, user cohort, data cohort 156, or campaign identifier), statistical characteristics of the data (such as volatility, trend slope, or frequency content), or prior model performance on similar sequential analysis windows 152. In some cases, processor 112 may retrieve a model registry or mapping table from memory 116 or data store 136, in which each output machine-learning model 144 is indexed by a type of output training dataset 148 it was trained on. For example, and without limitation, one output machine-learning model 144 may be specialized for early-morning user behavior, another for peak-traffic midday intervals, and another for low-activity nighttime periods. In some cases, these output training datasets 148 may include historical longitudinal datasets specific to a particular monitored parameter 124 or a particular data cohort 156. When processor 112 identifies that a given sequential analysis window 152 corresponds to a known condition for which a dedicated output machine-learning model 144 exists, processor 112 may select that output machine-learning model 144 accordingly. Once the appropriate output machine-learning model 144 is selected for a given sequential analysis window 152, processor 112 may supply data from sequential analysis window 152 as input to the output machine-learning model 144.

With continued reference to FIG. 1, memory 116 contains instructions configuring processor 112 to generate and execute a control command 140 as a function of machine learning output 104. For the purposes of this disclosure, a "control command" is an instruction or set of instructions to modify, regulate, or influence an operational behavior of one or more components within an apparatus. In some cases, control command 140 may allow processor 112 to adapt its processing strategy, data acquisition rate (sampling rate 128), user interface behavior, or resource allocation based on analytical insights (machine learning output 104) derived from longitudinal datasets 108. In some cases, control command 140 may be stored in data store 136. In some cases, processor 112 may retrieve control command 140 from data store 136. In some cases, a user may manually input control command 140.

With continued reference to FIG. 1, executing control command 140 includes selectively increasing an analysis frequency 160 upon detecting a positive machine learning output 164. For the purposes of this disclosure, an "analysis frequency" is a rate or periodicity at which an apparatus 100 performs data processing operations, the generation of machine learning outputs 104, and the execution of related control logic. In some cases, analysis frequency 160 may define a temporal resolution at which an apparatus 100 analyzes temporal data points 120 and updates its forecasts or decisions (e.g., machine learning outputs 104). In some cases, analysis frequency 160 may be expressed in units such as operations per minute, hour, day, or other defined time intervals. In some cases, analysis frequency 160 may govern how frequently an apparatus 100 engages its output machine-learning models 144 or analytic routines. In a non-limiting example, higher analysis frequency 160 may enable near-real-time forecasting and responsiveness to rapidly changing data conditions, while a lower analysis frequency 160 may conserve computational resources when data patterns are stable or less time-sensitive. In some embodiments, analysis frequency 160 may be selectively increased or decreased as a function of control command 140, which is itself generated based on the nature of machine learning output 104.

With continued reference to FIG. 1, for the purposes of this disclosure, "selectively increasing or decreasing" refers to a conditional and context-dependent adjustment of a parameter of an apparatus 100. For example, and without limitation, selectively increasing may involve raising an analysis frequency 160 or sampling rate 128 only when a machine learning output 104 exceeds a defined positive threshold, such as predicting a rise in user engagement, identifying an emerging anomaly, or detecting a critical event.

With continued reference to FIG. 1, for the purposes of this disclosure, a "positive machine learning output" is a machine learning output that satisfies one or more predefined favorable conditions, thresholds, or classifications indicative of an improving, desirable, or advantageous trend for a monitored parameter. For example, and without limitation, machine learning output 104 indicating a rising conversion rate, an upward trend in user engagement, or the absence of anomalies may each qualify as a positive machine learning output 164. In some cases, processor 112 may assess whether machine learning output 104 qualifies as positive machine learning output 164 using a rule evaluation process. For example, and without limitation, if machine learning output 104 is a predicted engagement rate, processor 112 may compare the machine learning output 104 against a positive threshold (e.g., greater than 15% increase) to determine whether the machine learning output 104 reflects a favorable trend. As a non-limiting example, a positive machine learning output 164 may include a forecast indicating a projected 25% increase in daily website traffic over the next seven days, based on upward trends identified in historical longitudinal datasets 108. This output may trigger the apparatus to increase the analysis frequency 160 in order to capture more granular user engagement patterns during the surge period. In another example, a classification result generated by a model may indicate "normal operating conditions" with high confidence, suggesting system stability and qualifying as a positive machine learning output 164. In another non-limiting example, example, if output machine-learning model 144 classifies a sequential analysis window as "normal," "expected," or "opportunity," processor 112 may interpret that label as a positive machine learning output 164. For the purposes of this disclosure, a "positive threshold" is a quantitative or qualitative boundary value to evaluate whether a machine learning output reflects a favorable or desirable system condition. As a non-limiting example, a positive threshold may be expressed numerically, such as a minimum predicted engagement rate, a confidence score exceeding a certain level, or a predicted trend slope surpassing a defined rate of change. As a non-limiting example, a positive threshold may be defined categorically, such as the presence of a specific label output by an output machine-learning model 144 (e.g., "growth," "normal," or "stable"). In some cases, positive threshold may be static, configured during system initialization based on empirical analysis or domain-specific knowledge. In some cases, positive threshold may be dynamically adjustable based on changing operating conditions or data cohort 156. In some cases, positive threshold may be stored in data store 136. In some cases, user may manually input positive threshold.

With continued reference to FIG. 1, executing control command 140 includes selectively decreasing an analysis frequency 160 upon detecting a negative machine learning output 168. For the purposes of this disclosure, a "negative machine learning output" is a machine learning output that satisfies one or more predefined unfavorable conditions, thresholds, or classifications indicative of a declining, undesirable, or adverse trend of a monitored parameter. As a non-limiting example, negative machine learning output 168 may include a predicted drop in user retention, identification of anomalous system behavior, or a classification associated with performance degradation, risk exposure, or reduced operational efficiency. As a non-limiting example, a negative machine learning output 168 may include an anomaly detection result indicating a statistically significant drop in average session duration, identified from recent temporal data points 120 within a monitored parameter 124 related to user engagement. This decline may be flagged as indicative of user disengagement or technical issues, thereby triggering a control command 140 to reduce the analysis frequency 160 or initiate fault analysis. Another non-limiting example of a negative machine learning output 168 may include a forecasted 15% decrease in conversion rates over a forecast window, derived from segment-level behavior within a longitudinal dataset 108. For the purposes of this disclosure, a "negative threshold" is a quantitative or qualitative boundary value to determine whether a machine learning output 104 reflects an unfavorable, degraded, or low-priority condition with respect to at least one monitored parameter. In some cases, negative threshold may serve as a decision criterion that enables the classification of a machine learning output 104 as a negative machine learning output 168, which may subsequently trigger adaptive system responses, such as selectively decreasing analysis frequency 160 or initiating diagnostic procedures. As a non-limiting example, negative threshold may take a form of a numerical lower bound, such as a predicted engagement score falling below a minimum acceptable level, a probability of success below a defined cutoff, or a negative trend slope indicating consistent decline. As a non-limiting example, negative threshold may be represented categorically, such as when a output machine-learning model 144 assigns a classification label like "low activity," "underperforming," or "anomalous." In some cases, negative threshold may be defined statically at system configuration. In some cases, negative threshold may be dynamically adjusted based on historical trends, data cohort 156, or external operating conditions.

With continued reference to FIG. 1, generating and executing control command 140 may include receiving each of a plurality of longitudinal datasets 108 at a different sampling rate 128 and modifying the sampling rate 128 of each of the plurality of longitudinal datasets 108 as a function of machine learning output 104. For the purposes of this disclosure, a "sampling rate" is a measure of a temporal frequency at which data points representing a monitored parameter are acquired, recorded, or transmitted to a processor. In some cases, sampling rate 128 may define an interval between successive temporal data points 120 in a longitudinal dataset 108. In some cases, sampling rate 128 may be expressed in terms of time per sample (e.g., one data point every five seconds) or samples per unit time (e.g., 10 samples per second). In some cases, sampling rate 128 may vary across different data sources or monitored parameters 124. In some cases, sampling rate 128 may be fixed. In some cases, sampling rate 128 may be dynamically adjustable. For example, and without limitation, if machine learning output 104 meets a condition indicating increased analytical relevance, such as detecting a positive trend, a developing anomaly, or a state transition, processor 112 may issue a control command 140 to increase sampling rate 128 of the corresponding longitudinal dataset 108. For example, and without limitation, if machine learning output 104 indicates system stability, low variability, or low engagement likelihood, processor 112 may issue a command to reduce the sampling rate 128 or vice versa.

With continued reference to FIG. 1, in some cases, modifying sampling rate 128 may include adjusting a first sampling rate of a first longitudinal dataset to an intermittent sampling mode wherein the adjustment may reduce resource utilization for a portion of a plurality of longitudinal datasets 108 including a monitored parameter 124 identified as stable. In some cases, stable monitored parameter 124 may be determined by identifying anomaly within longitudinal dataset 108 as described above. For the purposes of this disclosure, "resource utilization" refers to a consumption of computational, memory, storage, network, and processing resources required to acquire, store, analyze, and manage time-stamped data points contained within one or more longitudinal datasets. Each longitudinal dataset 108 may include a temporally ordered sequence of observations associated with at least one monitored parameter 124, and the continuous or high-frequency handling of such datasets may incur quantifiable demands on system resources. As a non-limiting example, resource utilization of longitudinal datasets 108 may include frequency of data sampling (impacting data ingestion and network throughput), the volume of stored historical data, the frequency of model execution on incoming data, and the rendering of associated data visualizations on a graphical user interface. For the purposes of this disclosure, an "intermittent sampling mode" is a data acquisition configuration in which time-stamped data points associated with a monitored parameter are collected at irregular, reduced, or non-continuous intervals. In intermittent sampling mode, processor 112 may be instructed to acquire, pull or retrieve data only at predefined intervals, event triggers, or under specific conditions, thereby minimizing data volume and computational load during periods of low variability or reduced analytical priority. For example, and without limitation, if a forecasting model predicts low volatility or declining user activity over an extended time window, processor 112 may classify machine learning output 104 as a negative machine learning output 168 and respond by reducing the sampling rate 128, placing the relevant data stream into intermittent sampling mode.

With continued reference to FIG. 1, in some cases, modifying sampling rate 128 may include adjusting a second sampling rate of a second longitudinal dataset to a continuous sampling mode, wherein the adjustment may preserve forecasting accuracy for a portion of a plurality of longitudinal datasets 108 including a monitored parameter 124 identified as anomalous. For the purposes of this disclosure, "forecasting accuracy" refers to the degree to which a machine learning output generated by an output machine-learning model correctly predicts or reflects the future state, value, or classification of at least one monitored parameter. Forecasting accuracy may indicate a quantitative measure of predictive performance of an output machine-learning model. In some cases, modifying sampling rate 128 may improve a mean absolute error (MAE), root mean square error (RMSE), classification accuracy, precision, recall, F1 score, or confidence intervals, depending on the nature of the output (e.g., regression or classification) of output machine-learning model 144. Forecasting accuracy of output machine-learning model 144 can improve based on the fidelity and completeness of input data. Therefore, modifying sampling rate 128 to increase the granularity of data collected from a longitudinal dataset 108 such as transitioning to continuous sampling mode may provide output machine-learning model 144 with more timely and detailed observations. For the purposes of this disclosure, a "continuous sampling mode" is a data acquisition configuration in which time-stamped data points associated with a monitored parameter are collected at a fixed, high-frequency, and uninterrupted rate over time. In continuous sampling mode, processor 112 may retrieve, pull or obtain data from in near real-time or at consistent, closely spaced intervals, enabling high-resolution observation of the temporal dynamics of the monitored parameter 124. Continuous sampling mode may be activated as a function of machine learning output 104 that indicates an increased level of activity, volatility, or analytical significance within a specific longitudinal dataset 108. For example, and without limitation, when a forecasting model predicts a rapid upward trend in user engagement, detects an emerging anomaly, or classifies a system state as critical or time-sensitive, processor 112 may respond by configuring the associated data stream to enter continuous sampling mode, thereby ensuring that no significant events are missed during periods of rapid change.

With continued reference to FIG. 1, memory 116 contains instructions configuring processor 112 to modify a graphical user interface (GUI) 172 as a function of a machine learning output 104. In some cases, processor 112 may modify GUI 172 using an interface modification logic stored in memory 116 or data store 136. In some cases, interface modification logic may include rules that specify which interface elements or graphical elements to highlight, suppress, update, or reconfigure based on machine learning output 104. For example, and without limitation, if a machine learning output 104 indicates a predicted increase in user engagement or performance metrics, graphical user interface 172 may be modified to display positive visual cues, such as color changes, upward-trending indicators, or expanded detail panels. For example, and without limitation, if a machine learning output 104 suggests an anomaly or decline, GUI 172 may render alerts, error icons, or highlight problematic regions using contrasting visual indicators. In some embodiments, processor 112 may modify graphical user interface 172 by adjusting data visualizations such as charts, tables, or graphs to reflect machine learning output 104. As a non-limiting example, processor 112 may modify a scale, scope, or time range of graphical elements, insert dynamic annotations, or enable user-interactive elements to drill down into relevant data segments. For instance, and without limitation, if a machine learning output 104 indicates an unexpected spike in user engagement during a specific analysis window, processor 112 may automatically adjust a time range displayed on a traffic heatmap within graphical user interface 172 to zoom into that interval. For instance, and without limitation, processor 112 may insert a dynamic annotation, such as a colored marker or a contextual note, highlighting the detected spike and labeling it with machine learning output 104, such as "anomalous increase." In another example, if a machine learning output 104 identifies a downward trend in a monitored parameter 124 such as conversion rate, processor 112 may modify a vertical scale of a trend line chart to better visualize the degree of decline and may enable a user-interactive element, such as a clickable icon, that, when selected, expands a panel showing granular metrics or historical comparisons relevant to that decline.

With continued reference to FIG. 1, in some embodiments, at least a processor 112 may be configured to generate a user interface displaying longitudinal datasets 108, temporal data points 120, monitored parameter 124, machine learning output 104, control command 140, historical data, and the like. For the purposes of this disclosure, a "user interface" is a means by which a user and a computer system interact. For example through the use of input devices and software. A user interface may include a graphical user interface (GUI), command line interface (CLI), menu-driven user interface, touch user interface, voice user interface (VUI), form-based user interface, any combination thereof and the like. In some embodiments, user interface may operate on and/or be communicatively connected to a decentralized platform, metaverse, and/or a decentralized exchange platform associated with the user. For example, a user may interact with user interface in virtual reality. In some embodiments, a user may interact with the user interface using a computing device distinct from and communicatively connected to at least a processor 112. For example, a smart phone, smart, tablet, or laptop operated by a user. In an embodiment, user interface may include a graphical user interface 172. A "graphical user interface," as used herein, is a graphical form of user interface that allows users to interact with electronic devices. In some embodiments, GUI 172 may include icons, menus, other visual indicators or representations (graphics), audio indicators such as primary notation, and display information and related user controls. A menu may contain a list of choices and may allow users to select one from them. A menu bar may be displayed horizontally across the screen such as pull-down menu. When any option is clicked in this menu, then the pull-down menu may appear. A menu may include a context menu that appears only when the user performs a specific action. An example of this is pressing the right mouse button. When this is done, a menu may appear under the cursor. Files, programs, web pages and the like may be represented using a small picture in a graphical user interface. For example, links to decentralized platforms as described in this disclosure may be incorporated using icons. Using an icon may be a fast way to open documents, run programs etc. because clicking on them yields instant access.

With continued reference to FIG. 1, in some cases, GUI 172 may include one or more event handlers. An "event handler" as used in this disclosure is a callback routine that operates asynchronously once an event takes place. Event handlers may include, without limitation, one or more programs to perform one or more actions based on user input, such as generating pop-up windows, submitting forms, changing background colors of a webpage, and the like. Event handlers may be programmed for specific user input, such as, but not limited to, mouse clicks, mouse hovering, touchscreen input, keystrokes, and the like. For instance and without limitation, an event handler may be programmed to generate a pop-up window if a user double clicks on a specific icon. User input may include a manipulation of computer icons, such as, but not limited to, clicking, selecting, dragging and dropping, scrolling, and the like. In some embodiments, user input may include an entry of characters and/or symbols in a user input field. A "user input field" as used in this disclosure is a portion of a graphical user interface configured to receive data from an individual. A user input field may include, but is not limited to, text boxes numerical fields, search fields, filtering fields, and the like. In some embodiments, user input may include touch input. Touch input may include, but is not limited to, single taps, double taps, triple taps, long presses, swiping gestures, and the like. One of ordinary skill in the art will appreciate the various ways a user may interact with GUI 172. The interactivity of the GUI 172 may allow users to manipulate graphical elements and a plurality of event handlers that detects various changes in the graphical elements. In some embodiments, users may manipulate graphical elements, such as dragging or resizing timeline bars, which directly trigger updates to underlying event attributes. In some cases, modifying GUI 172 may include rending a plurality of disparate graphical elements as a function of machine learning output 104, wherein each of the plurality of disparate graphical elements may be associated with a distinct classification of the machine learning output 104 and each of the plurality of disparate graphical elements may be configured to visually emphasize the distinct classification of the machine learning output 104. For the purposes of this disclosure, "graphical elements" are visual components that convey information, status, feedback, or analytical results. For the purposes of this disclosure, "disparate graphical elements" are visual components that are structurally or stylistically distinct from one another. In some cases, disparate graphical elements may serve to communicate different types of forecasting results or system states (machine learning output 104). Each graphical element may correspond to a specific classification produced by the output machine-learning model, such as a prediction of normal behavior, an anomaly, a positive machine learning output 164, or a negative machine learning output 168, thereby providing users with a visual representation tailored to the semantic meaning of the machine learning output 104. For example, and without limitation, an machine learning output 104 classified as "anomaly" may be represented by a red warning icon or flashing indicator, an machine learning output 104 indicating "positive growth" may be shown using a green upward-trending graph and a machine learning output 104 indicating "stable" may result in a neutral-toned status bar or static chart element. Each of disparate graphical elements may be configured to visually emphasize the distinct classification it represents. This may include differences in color, shape, animation, text labeling, or layout position.

Figure 2:
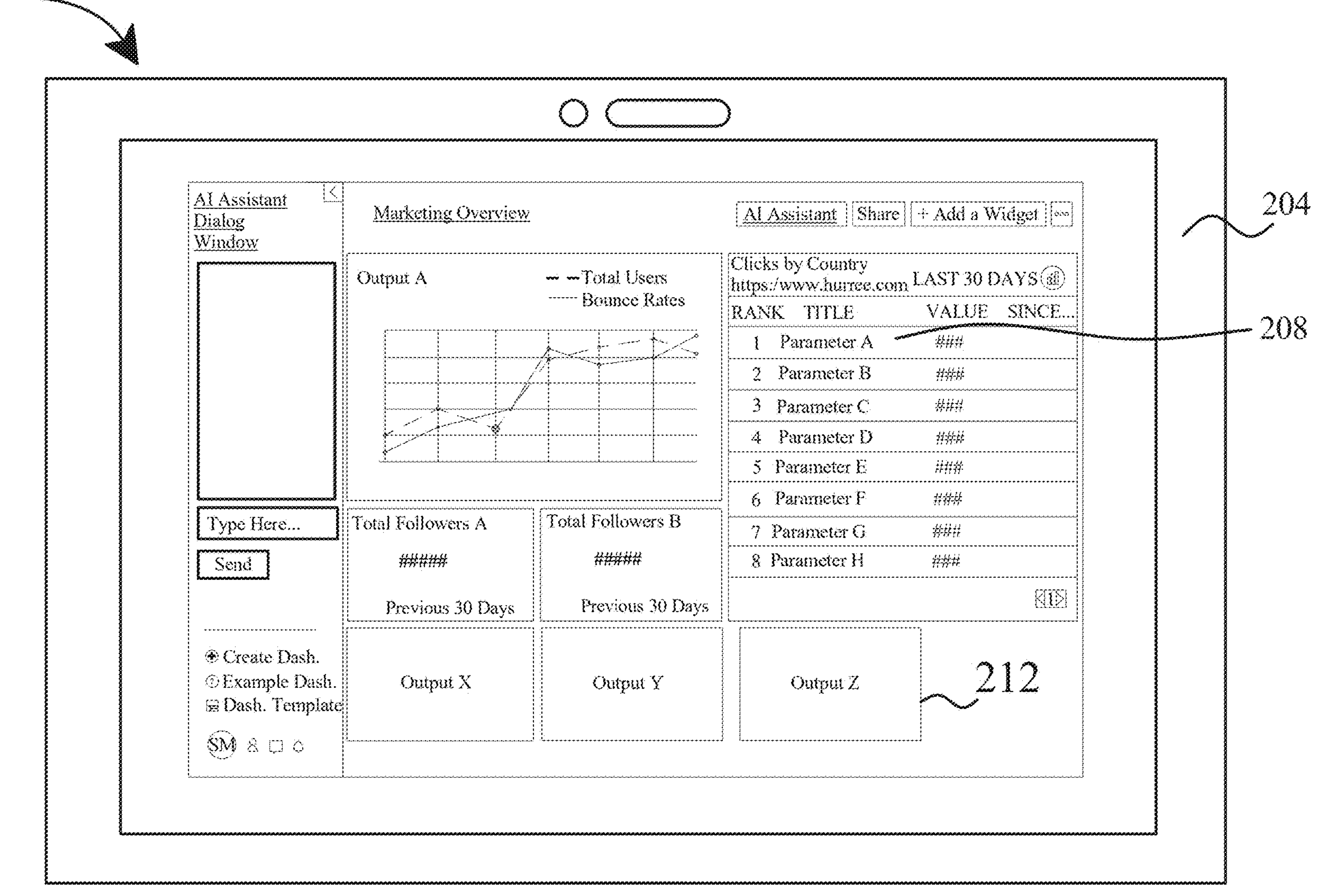
FIG. 2 illustrates an exemplary user interface.

Referring now to FIG. 2, an exemplary user interface 200 is illustrated. In some embodiment, user interface 200 may be rendered on a downstream device 204. As a non-limiting example, downstream device 204 may include a display-equipped computing device such as a tablet, laptop, desktop monitor, or other graphical terminal. The downstream device 204 may be communicatively coupled to processor. In some cases, user interface 200 may include one or more graphical regions populated with longitudinal datasets 208, each including a plurality of time-stamped data points associated with one or more monitored parameters. As a non-limiting example, longitudinal datasets 208 may reflect metrics such as website visits, bounce rates, user clicks, or social media engagement over a defined time period. In some cases, longitudinal dataset 208 may be visualized in chart or tabular form. In some cases, machine learning output 212 may be displayed within a designated region of a user interface 200. As a non-limiting example, machine learning output 212 may represent a predictive or classification result. In some cases, machine learning output 212 may be associated with a specific monitored parameter or cohort. In some embodiments, processor may update a content, scope, or time range of the graphical elements representing longitudinal dataset 208 or machine-learning output 212. For example, if machine-learning output 212 indicates an anomalous increase in bounce rates, processor may zoom into a narrower time interval in the corresponding dataset chart to emphasize the detected anomaly. In some cases, user-interactive elements within the user interface 200 may be enabled to allow the user to drill down into underlying data associated with the forecasted output, thereby enhancing interpretability and enabling responsive decision-making directly within the downstream device 204.

Figure 3:
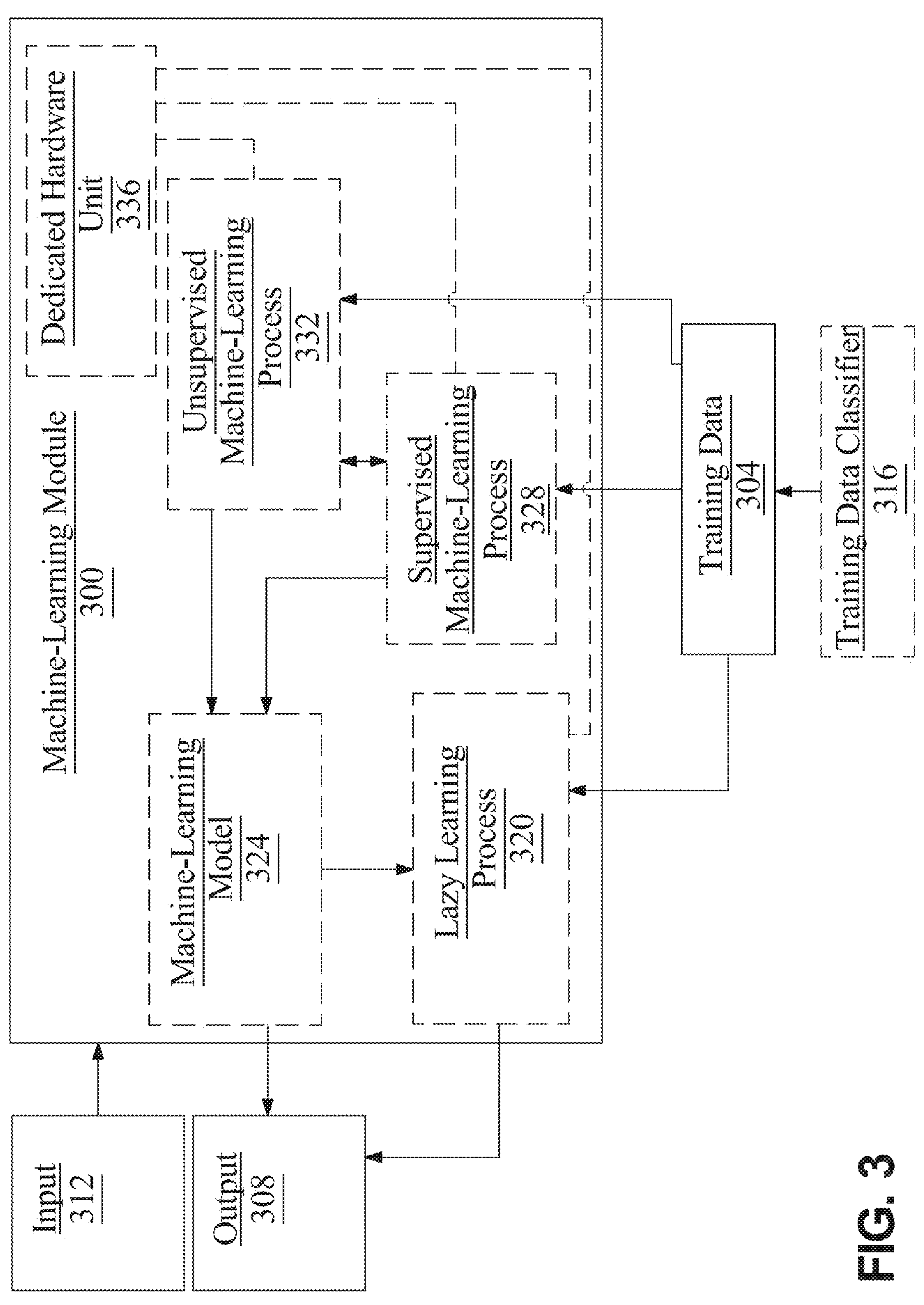
FIG. 3 illustrates a block diagram of an exemplary machine-learning module.

Referring now to FIG. 3, an exemplary embodiment of a machine-learning module 300 that may perform one or more machine-learning processes as described in this disclosure is illustrated. Machine-learning module may perform determinations, classification, and/or analysis steps, methods, processes, or the like as described in this disclosure using machine learning processes. A "machine learning process," as used in this disclosure, is a process that automatedly uses training data 304 to generate an algorithm instantiated in hardware or software logic, data structures, and/or functions that will be performed by a computing device/module to produce outputs 308 given data provided as inputs 312; this is in contrast to a non-machine learning software program where the commands to be executed are determined in advance by a user and written in a programming language.

Still referring to FIG. 3, "training data," as used herein, is data containing correlations that a machine-learning process may use to model relationships between two or more categories of data elements. For instance, and without limitation, training data 304 may include a plurality of data entries, also known as "training examples," each entry representing a set of data elements that were recorded, received, and/or generated together; data elements may be correlated by shared existence in a given data entry, by proximity in a given data entry, or the like. Multiple data entries in training data 304 may evince one or more trends in correlations between categories of data elements; for instance, and without limitation, a higher value of a first data element belonging to a first category of data element may tend to correlate to a higher value of a second data element belonging to a second category of data element, indicating a possible proportional or other mathematical relationship linking values belonging to the two categories. Multiple categories of data elements may be related in training data 304 according to various correlations; correlations may indicate causative and/or predictive links between categories of data elements, which may be modeled as relationships such as mathematical relationships by machine-learning processes as described in further detail below. Training data 304 may be formatted and/or organized by categories of data elements, for instance by associating data elements with one or more descriptors corresponding to categories of data elements. As a non-limiting example, training data 304 may include data entered in standardized forms by persons or processes, such that entry of a given data element in a given field in a form may be mapped to one or more descriptors of categories. Elements in training data 304 may be linked to descriptors of categories by tags, tokens, or other data elements; for instance, and without limitation, training data 304 may be provided in fixed-length formats, formats linking positions of data to categories such as comma-separated value (CSV) formats and/or self-describing formats such as extensible markup language (XML), JavaScript Object Notation (JSON), or the like, enabling processes or devices to detect categories of data.

Alternatively or additionally, and continuing to refer to FIG. 3, training data 304 may include one or more elements that are not categorized; that is, training data 304 may not be formatted or contain descriptors for some elements of data. Machine-learning algorithms and/or other processes may sort training data 304 according to one or more categorizations using, for instance, natural language processing algorithms, tokenization, detection of correlated values in raw data and the like; categories may be generated using correlation and/or other processing algorithms. As a non-limiting example, in a corpus of text, phrases making up a number "n" of compound words, such as nouns modified by other nouns, may be identified according to a statistically significant prevalence of n-grams containing such words in a particular order; such an n-gram may be categorized as an element of language such as a "word" to be tracked similarly to single words, generating a new category as a result of statistical analysis. Similarly, in a data entry including some textual data, a person's name may be identified by reference to a list, dictionary, or other compendium of terms, permitting ad-hoc categorization by machine-learning algorithms, and/or automated association of data in the data entry with descriptors or into a given format. The ability to categorize data entries automatedly may enable the same training data 304 to be made applicable for two or more distinct machine-learning algorithms as described in further detail below. Training data 304 used by machine-learning module 300 may correlate any input data as described in this disclosure to any output data as described in this disclosure. As a non-limiting illustrative example, input data may include longitudinal datasets, temporal data points, monitored parameter, machine learning output, historical data, and the like. As a non-limiting illustrative example, output data may include machine learning output, control command, and the like.

Further referring to FIG. 3, training data may be filtered, sorted, and/or selected using one or more supervised and/or unsupervised machine-learning processes and/or models as described in further detail below; such models may include without limitation a training data classifier 316. Training data classifier 316 may include a "classifier," which as used in this disclosure is a machine-learning model as defined below, such as a data structure representing and/or using a mathematical model, neural net, or program generated by a machine learning algorithm known as a "classification algorithm," as described in further detail below, that sorts inputs into categories or bins of data, outputting the categories or bins of data and/or labels associated therewith. A classifier may be configured to output at least a datum that labels or otherwise identifies a set of data that are clustered together, found to be close under a distance metric as described below, or the like. A distance metric may include any norm, such as, without limitation, a Pythagorean norm. Machine-learning module 300 may generate a classifier using a classification algorithm, defined as a process whereby a computing device and/or any module and/or component operating thereon derives a classifier from training data 304. Classification may be performed using, without limitation, linear classifiers such as without limitation logistic regression and/or naive Bayes classifiers, nearest neighbor classifiers such as k-nearest neighbors classifiers, support vector machines, least squares support vector machines, fisher's linear discriminant, quadratic classifiers, decision trees, boosted trees, random forest classifiers, learning vector quantization, and/or neural network-based classifiers. As a non-limiting example, training data classifier 316 may classify elements of training data to data cohorts related to a type of project, a type of industry, and the like.

Still referring to FIG. 3, computing device may be configured to generate a classifier using a Naïve Bayes classification algorithm. Naïve Bayes classification algorithm generates classifiers by assigning class labels to problem instances, represented as vectors of element values. Class labels are drawn from a finite set. Naïve Bayes classification algorithm may include generating a family of algorithms that assume that the value of a particular element is independent of the value of any other element, given a class variable. Naïve Bayes classification algorithm may be based on Bayes Theorem expressed as P (A/B)=P (B/A) P (A)=P (B), where P (A/B) is the probability of hypothesis A given data B also known as posterior probability; P (B/A) is the probability of data B given that the hypothesis A was true; P (A) is the probability of hypothesis A being true regardless of data also known as prior probability of A; and P (B) is the probability of the data regardless of the hypothesis. A naïve Bayes algorithm may be generated by first transforming training data into a frequency table. Computing device may then calculate a likelihood table by calculating probabilities of different data entries and classification labels. Computing device may utilize a naïve Bayes equation to calculate a posterior probability for each class. A class containing the highest posterior probability is the outcome of prediction. Naïve Bayes classification algorithm may include a gaussian model that follows a normal distribution. Naïve Bayes classification algorithm may include a multinomial model that is used for discrete counts. Naïve Bayes classification algorithm may include a Bernoulli model that may be utilized when vectors are binary.

With continued reference to FIG. 3, computing device may be configured to generate a classifier using a K-nearest neighbors (KNN) algorithm. A "K-nearest neighbors algorithm" as used in this disclosure, includes a classification method that utilizes feature similarity to analyze how closely out-of-sample-features resemble training data to classify input data to one or more clusters and/or categories of features as represented in training data; this may be performed by representing both training data and input data in vector forms, and using one or more measures of vector similarity to identify classifications within training data, and to determine a classification of input data. K-nearest neighbors algorithm may include specifying a K-value, or a number directing the classifier to select the k most similar entries training data to a given sample, determining the most common classifier of the entries in the database, and classifying the known sample; this may be performed recursively and/or iteratively to generate a classifier that may be used to classify input data as further samples. For instance, an initial set of samples may be performed to cover an initial heuristic and/or "first guess" at an output and/or relationship, which may be seeded, without limitation, using expert input received according to any process as described herein. As a non-limiting example, an initial heuristic may include a ranking of associations between inputs and elements of training data. Heuristic may include selecting some number of highest-ranking associations and/or training data elements.

With continued reference to FIG. 3, generating k-nearest neighbors algorithm may generate a first vector output containing a data entry cluster, generating a second vector output containing an input data, and calculate the distance between the first vector output and the second vector output using any suitable norm such as cosine similarity, Euclidean distance measurement, or the like. Each vector output may be represented, without limitation, as an n-tuple of values, where n is at least two values. Each value of n-tuple of values may represent a measurement or other quantitative value associated with a given category of data, or attribute, examples of which are provided in further detail below; a vector may be represented, without limitation, in n-dimensional space using an axis per category of value represented in n-tuple of values, such that a vector has a geometric direction characterizing the relative quantities of attributes in the n-tuple as compared to each other. Two vectors may be considered equivalent where their directions, and/or the relative quantities of values within each vector as compared to each other, are the same; thus, as a non-limiting example, a vector represented as [5, 10, 15] may be treated as equivalent, for purposes of this disclosure, as a vector represented as [1, 2, 3]. Vectors may be more similar where their directions are more similar, and more different where their directions are more divergent; however, vector similarity may alternatively or additionally be determined using averages of similarities between like attributes, or any other measure of similarity suitable for any n-tuple of values, or aggregation of numerical similarity measures for the purposes of loss functions as described in further detail below. Any vectors as described herein may be scaled, such that each vector represents each attribute along an equivalent scale of values. Each vector may be "normalized," or divided by a "length" attribute, such as a length attribute l as derived using a Pythagorean norm:

$$l = \sqrt{\sum_{i=0}^{n} a_i^2},$$

where $\alpha_i$ is attribute number i of the vector. Scaling and/or normalization may function to make vector comparison independent of absolute quantities of attributes, while preserving any dependency on similarity of attributes; this may, for instance, be advantageous where cases represented in training data are represented by different quantities of samples, which may result in proportionally equivalent vectors with divergent values.

With further reference to FIG. 3, training examples for use as training data may be selected from a population of potential examples according to cohorts relevant to an analytical problem to be solved, a classification task, or the like. Alternatively or additionally, training data may be selected to span a set of likely circumstances or inputs for a machine-learning model and/or process to encounter when deployed. For instance, and without limitation, for each category of input data to a machine-learning process or model that may exist in a range of values in a population of phenomena such as images, user data, process data, physical data, or the like, a computing device, processor, and/or machine-learning model may select training examples representing each possible value on such a range and/or a representative sample of values on such a range. Selection of a representative sample may include selection of training examples in proportions matching a statistically determined and/or predicted distribution of such values according to relative frequency, such that, for instance, values encountered more frequently in a population of data so analyzed are represented by more training examples than values that are encountered less frequently. Alternatively or additionally, a set of training examples may be compared to a collection of representative values in a database and/or presented to a user, so that a process can detect, automatically or via user input, one or more values that are not included in the set of training examples. Computing device, processor, and/or module may automatically generate a missing training example; this may be done by receiving and/or retrieving a missing input and/or output value and correlating the missing input and/or output value with a corresponding output and/or input value collocated in a data record with the retrieved value, provided by a user and/or other device, or the like.

Continuing to refer to FIG. 3, computer, processor, and/or module may be configured to preprocess training data. "Preprocessing" training data, as used in this disclosure, is transforming training data from raw form to a format that can be used for training a machine learning model. Preprocessing may include sanitizing, feature selection, feature scaling, data augmentation and the like.

Still referring to FIG. 3, computer, processor, and/or module may be configured to sanitize training data. "Sanitizing" training data, as used in this disclosure, is a process whereby training examples are removed that interfere with convergence of a machine-learning model and/or process to a useful result. For instance, and without limitation, a training example may include an input and/or output value that is an outlier from typically encountered values, such that a machine-learning algorithm using the training example will be adapted to an unlikely amount as an input and/or output; a value that is more than a threshold number of standard deviations away from an average, mean, or expected value, for instance, may be eliminated. Alternatively or additionally, one or more training examples may be identified as having poor quality data, where "poor quality" is defined as having a signal to noise ratio below a threshold value. Sanitizing may include steps such as removing duplicative or otherwise redundant data, interpolating missing data, correcting data errors, standardizing data, identifying outliers, and the like. In a nonlimiting example, sanitization may include utilizing algorithms for identifying duplicate entries or spell-check algorithms.

As a non-limiting example, and with further reference to FIG. 3, images used to train an image classifier or other machine-learning model and/or process that takes images as inputs or generates images as outputs may be rejected if image quality is below a threshold value. For instance, and without limitation, computing device, processor, and/or module may perform blur detection, and eliminate one or more Blur detection may be performed, as a non-limiting example, by taking Fourier transform, or an approximation such as a Fast Fourier Transform (FFT) of the image and analyzing a distribution of low and high frequencies in the resulting frequency-domain depiction of the image; numbers of high-frequency values below a threshold level may indicate blurriness. As a further non-limiting example, detection of blurriness may be performed by convolving an image, a channel of an image, or the like with a Laplacian kernel; this may generate a numerical score reflecting a number of rapid changes in intensity shown in the image, such that a high score indicates clarity and a low score indicates blurriness. Blurriness detection may be performed using a gradient-based operator, which measures operators based on the gradient or first derivative of an image, based on the hypothesis that rapid changes indicate sharp edges in the image, and thus are indicative of a lower degree of blurriness. Blur detection may be performed using Wavelet-based operator, which takes advantage of the capability of coefficients of the discrete wavelet transform to describe the frequency and spatial content of images. Blur detection may be performed using statistics-based operators take advantage of several image statistics as texture descriptors in order to compute a focus level. Blur detection may be performed by using discrete cosine transform (DCT) coefficients in order to compute a focus level of an image from its frequency content.

Continuing to refer to FIG. 3, computing device, processor, and/or module may be configured to precondition one or more training examples. For instance, and without limitation, where a machine learning model and/or process has one or more inputs and/or outputs requiring, transmitting, or receiving a certain number of bits, samples, or other units of data, one or more training examples' elements to be used as or compared to inputs and/or outputs may be modified to have such a number of units of data. For instance, a computing device, processor, and/or module may convert a smaller number of units, such as in a low pixel count image, into a desired number of units, for instance by upsampling and interpolating. As a non-limiting example, a low pixel count image may have 100 pixels, however a desired number of pixels may be 128. Processor may interpolate the low pixel count image to convert the 100 pixels into 128 pixels. It should also be noted that one of ordinary skill in the art, upon reading this disclosure, would know the various methods to interpolate a smaller number of data units such as samples, pixels, bits, or the like to a desired number of such units. In some instances, a set of interpolation rules may be trained by sets of highly detailed inputs and/or outputs and corresponding inputs and/or outputs downsampled to smaller numbers of units, and a neural network or other machine learning model that is trained to predict interpolated pixel values using the training data. As a non-limiting example, a sample input and/or output, such as a sample picture, with sample-expanded data units (e.g., pixels added between the original pixels) may be input to a neural network or machine-learning model and output a pseudo replica sample-picture with dummy values assigned to pixels between the original pixels based on a set of interpolation rules. As a non-limiting example, in the context of an image classifier, a machine-learning model may have a set of interpolation rules trained by sets of highly detailed images and images that have been downsampled to smaller numbers of pixels, and a neural network or other machine learning model that is trained using those examples to predict interpolated pixel values in a facial picture context. As a result, an input with sample-expanded data units (the ones added between the original data units, with dummy values) may be run through a trained neural network and/or model, which may fill in values to replace the dummy values. Alternatively or additionally, processor, computing device, and/or module may utilize sample expander methods, a low-pass filter, or both. As used in this disclosure, a "low-pass filter" is a filter that passes signals with a frequency lower than a selected cutoff frequency and attenuates signals with frequencies higher than the cutoff frequency. The exact frequency response of the filter depends on the filter design. Computing device, processor, and/or module may use averaging, such as luma or chroma averaging in images, to fill in data units in between original data units.

In some embodiments, and with continued reference to FIG. 3, computing device, processor, and/or module may down-sample elements of a training example to a desired lower number of data elements. As a non-limiting example, a high pixel count image may have 256 pixels, however a desired number of pixels may be 128. Processor may down-sample the high pixel count image to convert the 256 pixels into 128 pixels. In some embodiments, processor may be configured to perform downsampling on data. Downsampling, also known as decimation, may include removing every Nth entry in a sequence of samples, all but every Nth entry, or the like, which is a process known as "compression," and may be performed, for instance by an N-sample compressor implemented using hardware or software. Anti-aliasing and/or anti-imaging filters, and/or low-pass filters, may be used to clean up side-effects of compression.

Further referring to FIG. 3, feature selection includes narrowing and/or filtering training data to exclude features and/or elements, or training data including such elements, that are not relevant to a purpose for which a trained machine-learning model and/or algorithm is being trained, and/or collection of features and/or elements, or training data including such elements, on the basis of relevance or utility for an intended task or purpose for a trained machine-learning model and/or algorithm is being trained. Feature selection may be implemented, without limitation, using any process described in this disclosure, including without limitation using training data classifiers, exclusion of outliers, or the like.

With continued reference to FIG. 3, feature scaling may include, without limitation, normalization of data entries, which may be accomplished by dividing numerical fields by norms thereof, for instance as performed for vector normalization. Feature scaling may include absolute maximum scaling, wherein each quantitative datum is divided by the maximum absolute value of all quantitative data of a set or subset of quantitative data. Feature scaling may include min-max scaling, in which each value X has a minimum value $X_{min}$ in a set or subset of values subtracted therefrom, with the result divided by the range of the values, give maximum value in the set or subset $$X_{max}: X_{new} = \frac{X - X_{min}}{X_{max} - X_{min}}.$$

Feature scaling may include mean normalization, which involves use of a mean value of a set and/or subset of values, $X_{mean}$ with maximum and minimum values:

$$X_{new} = \frac{X - X_{mean}}{X_{max} - X_{min}}.$$

Feature scaling may include standardization, where a difference between X and $X_{mean}$ is divided by a standard deviation σ of a set or subset of values:

$$X_{new} = \frac{X - X_{mean}}{\sigma}.$$

Scaling may be performed using a median value of a a set or subset $X_{median}$ and/or interquartile range (IQR), which represents the difference between the $25^{th}$ percentile value and the $50^{th}$ percentile value (or closest values thereto by a rounding protocol), such as:

$$X_{new} = \frac{X - X_{median}}{IQR}.$$

Persons skilled in the art, upon reviewing the entirety of this disclosure, will be aware of various alternative or additional approaches that may be used for feature scaling.

Further referring to FIG. 3, computing device, processor, and/or module may be configured to perform one or more processes of data augmentation. "Data augmentation" as used in this disclosure is addition of data to a training set using elements and/or entries already in the dataset. Data augmentation may be accomplished, without limitation, using interpolation, generation of modified copies of existing entries and/or examples, and/or one or more generative AI processes, for instance using deep neural networks and/or generative adversarial networks; generative processes may be referred to alternatively in this context as "data synthesis" and as creating "synthetic data." Augmentation may include performing one or more transformations on data, such as geometric, color space, affine, brightness, cropping, and/or contrast transformations of images.

Still referring to FIG. 3, machine-learning module 300 may be configured to perform a lazy-learning process 320 and/or protocol, which may alternatively be referred to as a "lazy loading" or "call-when-needed" process and/or protocol, may be a process whereby machine learning is conducted upon receipt of an input to be converted to an output, by combining the input and training set to derive the algorithm to be used to produce the output on demand. For instance, an initial set of simulations may be performed to cover an initial heuristic and/or "first guess" at an output and/or relationship. As a non-limiting example, an initial heuristic may include a ranking of associations between inputs and elements of training data 304. Heuristic may include selecting some number of highest-ranking associations and/or training data 304 elements. Lazy learning may implement any suitable lazy learning algorithm, including without limitation a K-nearest neighbors algorithm, a lazy naïve Bayes algorithm, or the like; persons skilled in the art, upon reviewing the entirety of this disclosure, will be aware of various lazy-learning algorithms that may be applied to generate outputs as described in this disclosure, including without limitation lazy learning applications of machine-learning algorithms as described in further detail below.

Alternatively or additionally, and with continued reference to FIG. 3, machine-learning processes as described in this disclosure may be used to generate machine-learning models 324. A "machine-learning model," as used in this disclosure, is a data structure representing and/or instantiating a mathematical and/or algorithmic representation of a relationship between inputs and outputs, as generated using any machine-learning process including without limitation any process as described above, and stored in memory; an input is submitted to a machine-learning model 324 once created, which generates an output based on the relationship that was derived. For instance, and without limitation, a linear regression model, generated using a linear regression algorithm, may compute a linear combination of input data using coefficients derived during machine-learning processes to calculate an output datum. As a further non-limiting example, a machine-learning model 324 may be generated by creating an artificial neural network, such as a convolutional neural network comprising an input layer of nodes, one or more intermediate layers, and an output layer of nodes. Connections between nodes may be created via the process of "training" the network, in which elements from a training data 304 set are applied to the input nodes, a suitable training algorithm (such as Levenberg-Marquardt, conjugate gradient, simulated annealing, or other algorithms) is then used to adjust the connections and weights between nodes in adjacent layers of the neural network to produce the desired values at the output nodes. This process is sometimes referred to as deep learning.

Still referring to FIG. 3, machine-learning algorithms may include at least a supervised machine-learning process 328. At least a supervised machine-learning process 328, as defined herein, include algorithms that receive a training set relating a number of inputs to a number of outputs, and seek to generate one or more data structures representing and/or instantiating one or more mathematical relations relating inputs to outputs, where each of the one or more mathematical relations is optimal according to some criterion specified to the algorithm using some scoring function. For instance, a supervised learning algorithm may include longitudinal datasets, temporal data points, monitored parameter, machine learning output, historical data, and the like as described above as inputs, machine learning output, control command, and the like as outputs, and a scoring function representing a desired form of relationship to be detected between inputs and outputs; scoring function may, for instance, seek to maximize the probability that a given input and/or combination of elements inputs is associated with a given output to minimize the probability that a given input is not associated with a given output. Scoring function may be expressed as a risk function representing an "expected loss" of an algorithm relating inputs to outputs, where loss is computed as an error function representing a degree to which a prediction generated by the relation is incorrect when compared to a given input-output pair provided in training data 304. Persons skilled in the art, upon reviewing the entirety of this disclosure, will be aware of various possible variations of at least a supervised machine-learning process 328 that may be used to determine relation between inputs and outputs. Supervised machine-learning processes may include classification algorithms as defined above.

With further reference to FIG. 3, training a supervised machine-learning process may include, without limitation, iteratively updating coefficients, biases, weights based on an error function, expected loss, and/or risk function. For instance, an output generated by a supervised machine-learning model using an input example in a training example may be compared to an output example from the training example; an error function may be generated based on the comparison, which may include any error function suitable for use with any machine-learning algorithm described in this disclosure, including a square of a difference between one or more sets of compared values or the like. Such an error function may be used in turn to update one or more weights, biases, coefficients, or other parameters of a machine-learning model through any suitable process including, without limitation, gradient descent processes, least-squares processes, and/or other processes described in this disclosure. This may be done iteratively and/or recursively to gradually tune such weights, biases, coefficients, or other parameters. Updating may be performed, in neural networks, using one or more back-propagation algorithms. Iterative and/or recursive updates to weights, biases, coefficients, or other parameters as described above may be performed until currently available training data is exhausted and/or until a convergence test is passed, where a "convergence test" is a test for a condition selected as indicating that a model and/or weights, biases, coefficients, or other parameters thereof has reached a degree of accuracy. A convergence test may, for instance, compare a difference between two or more successive errors or error function values, where differences below a threshold amount may be taken to indicate convergence. Alternatively or additionally, one or more errors and/or error function values evaluated in training iterations may be compared to a threshold.

Still referring to FIG. 3, a computing device, processor, and/or module may be configured to perform method, method step, sequence of method steps and/or algorithm described in reference to this figure, in any order and with any degree of repetition. For instance, a computing device, processor, and/or module may be configured to perform a single step, sequence and/or algorithm repeatedly until a desired or commanded outcome is achieved; repetition of a step or a sequence of steps may be performed iteratively and/or recursively using outputs of previous repetitions as inputs to subsequent repetitions, aggregating inputs and/or outputs of repetitions to produce an aggregate result, reduction or decrement of one or more variables such as global variables, and/or division of a larger processing task into a set of iteratively addressed smaller processing tasks. A computing device, processor, and/or module may perform any step, sequence of steps, or algorithm in parallel, such as simultaneously and/or substantially simultaneously performing a step two or more times using two or more parallel threads, processor cores, or the like; division of tasks between parallel threads and/or processes may be performed according to any protocol suitable for division of tasks between iterations. Persons skilled in the art, upon reviewing the entirety of this disclosure, will be aware of various ways in which steps, sequences of steps, processing tasks, and/or data may be subdivided, shared, or otherwise dealt with using iteration, recursion, and/or parallel processing.

Further referring to FIG. 3, machine learning processes may include at least an unsupervised machine-learning processes 332. An unsupervised machine-learning process, as used herein, is a process that derives inferences in datasets without regard to labels; as a result, an unsupervised machine-learning process may be free to discover any structure, relationship, and/or correlation provided in the data. Unsupervised processes 332 may not require a response variable; unsupervised processes 332 may be used to find interesting patterns and/or inferences between variables, to determine a degree of correlation between two or more variables, or the like.

Still referring to FIG. 3, machine-learning module 300 may be designed and configured to create a machine-learning model 324 using techniques for development of linear regression models. Linear regression models may include ordinary least squares regression, which aims to minimize the square of the difference between predicted outcomes and actual outcomes according to an appropriate norm for measuring such a difference (e.g., a vector-space distance norm); coefficients of the resulting linear equation may be modified to improve minimization. Linear regression models may include ridge regression methods, where the function to be minimized includes the least-squares function plus term multiplying the square of each coefficient by a scalar amount to penalize large coefficients. Linear regression models may include least absolute shrinkage and selection operator (LASSO) models, in which ridge regression is combined with multiplying the least-squares term by a factor of 1 divided by double the number of samples. Linear regression models may include a multi-task lasso model wherein the norm applied in the least-squares term of the lasso model is the Frobenius norm amounting to the square root of the sum of squares of all terms. Linear regression models may include the elastic net model, a multi-task elastic net model, a least angle regression model, a LARS lasso model, an orthogonal matching pursuit model, a Bayesian regression model, a logistic regression model, a stochastic gradient descent model, a perceptron model, a passive aggressive algorithm, a robustness regression model, a Huber regression model, or any other suitable model that may occur to persons skilled in the art upon reviewing the entirety of this disclosure. Linear regression models may be generalized in an embodiment to polynomial regression models, whereby a polynomial equation (e.g. a quadratic, cubic or higher-order equation) providing a best predicted output/actual output fit is sought; similar methods to those described above may be applied to minimize error functions, as will be apparent to persons skilled in the art upon reviewing the entirety of this disclosure.

Continuing to refer to FIG. 3, machine-learning algorithms may include, without limitation, linear discriminant analysis. Machine-learning algorithm may include quadratic discriminant analysis. Machine-learning algorithms may include kernel ridge regression. Machine-learning algorithms may include support vector machines, including, without limitation, support vector classification-based regression processes. Machine-learning algorithms may include stochastic gradient descent algorithms, including classification and regression algorithms based on stochastic gradient descent. Machine-learning algorithms may include nearest neighbors algorithms. Machine-learning algorithms may include various forms of latent space regularization such as variational regularization. Machine-learning algorithms may include Gaussian processes such as Gaussian Process Regression. Machine-learning algorithms may include cross-decomposition algorithms, including partial least squares and/or canonical correlation analysis. Machine-learning algorithms may include naïve Bayes methods. Machine-learning algorithms may include algorithms based on decision trees, such as decision tree classification or regression algorithms. Machine-learning algorithms may include ensemble methods such as bagging meta-estimator, forest of randomized trees, AdaBoost, gradient tree boosting, and/or voting classifier methods. Machine-learning algorithms may include neural net algorithms, including convolutional neural net processes.

Still referring to FIG. 3, a machine-learning model and/or process may be deployed or instantiated by incorporation into a program, apparatus, system and/or module. For instance, and without limitation, a machine-learning model, neural network, and/or some or all parameters thereof may be stored and/or deployed in any memory or circuitry. Parameters such as coefficients, weights, and/or biases may be stored as circuit-based constants, such as arrays of wires and/or binary inputs and/or outputs set at logic "1" and "0" voltage levels in a logic circuit to represent a number according to any suitable encoding system including twos complement or the like or may be stored in any volatile and/or non-volatile memory. Similarly, mathematical operations and input and/or output of data to or from models, neural network layers, or the like may be instantiated in hardware circuitry and/or in the form of instructions in firmware, machine-code such as binary operation code instructions, assembly language, or any higher-order programming language. Any technology for hardware and/or software instantiation of memory, instructions, data structures, and/or algorithms may be used to instantiate a machine-learning process and/or model, including without limitation any combination of production and/or configuration of non-reconfigurable hardware elements, circuits, and/or modules such as without limitation ASICs, production and/or configuration of reconfigurable hardware elements, circuits, and/or modules such as without limitation FPGAs, production and/or of non-reconfigurable and/or configuration non-rewritable memory elements, circuits, and/or modules such as without limitation non-rewritable ROM, production and/or configuration of reconfigurable and/or rewritable memory elements, circuits, and/or modules such as without limitation rewritable ROM or other memory technology described in this disclosure, and/or production and/or configuration of any computing device and/or component thereof as described in this disclosure. Such deployed and/or instantiated machine-learning model and/or algorithm may receive inputs from any other process, module, and/or component described in this disclosure, and produce outputs to any other process, module, and/or component described in this disclosure.

Continuing to refer to FIG. 3, any process of training, retraining, deployment, and/or instantiation of any machine-learning model and/or algorithm may be performed and/or repeated after an initial deployment and/or instantiation to correct, refine, and/or improve the machine-learning model and/or algorithm. Such retraining, deployment, and/or instantiation may be performed as a periodic or regular process, such as retraining, deployment, and/or instantiation at regular elapsed time periods, after some measure of volume such as a number of bytes or other measures of data processed, a number of uses or performances of processes described in this disclosure, or the like, and/or according to a software, firmware, or other update schedule. Alternatively or additionally, retraining, deployment, and/or instantiation may be event-based, and may be triggered, without limitation, by user inputs indicating sub-optimal or otherwise problematic performance and/or by automated field testing and/or auditing processes, which may compare outputs of machine-learning models and/or algorithms, and/or errors and/or error functions thereof, to any thresholds, convergence tests, or the like, and/or may compare outputs of processes described herein to similar thresholds, convergence tests or the like. Event-based retraining, deployment, and/or instantiation may alternatively or additionally be triggered by receipt and/or generation of one or more new training examples; a number of new training examples may be compared to a preconfigured threshold, where exceeding the preconfigured threshold may trigger retraining, deployment, and/or instantiation.

Still referring to FIG. 3, retraining and/or additional training may be performed using any process for training described above, using any currently or previously deployed version of a machine-learning model and/or algorithm as a starting point. Training data for retraining may be collected, preconditioned, sorted, classified, sanitized or otherwise processed according to any process described in this disclosure. Training data may include, without limitation, training examples including inputs and correlated outputs used, received, and/or generated from any version of any system, module, machine-learning model or algorithm, apparatus, and/or method described in this disclosure; such examples may be modified and/or labeled according to user feedback or other processes to indicate desired results, and/or may have actual or measured results from a process being modeled and/or predicted by system, module, machine-learning model or algorithm, apparatus, and/or method as "desired" results to be compared to outputs for training processes as described above.

Redeployment may be performed using any reconfiguring and/or rewriting of reconfigurable and/or rewritable circuit and/or memory elements; alternatively, redeployment may be performed by production of new hardware and/or software components, circuits, instructions, or the like, which may be added to and/or may replace existing hardware and/or software components, circuits, instructions, or the like.

Further referring to FIG. 3, one or more processes or algorithms described above may be performed by at least a dedicated hardware unit 336. A "dedicated hardware unit," for the purposes of this figure, is a hardware component, circuit, or the like, aside from a principal control circuit and/or processor performing method steps as described in this disclosure, that is specifically designated or selected to perform one or more specific tasks and/or processes described in reference to this figure, such as without limitation preconditioning and/or sanitization of training data and/or training a machine-learning algorithm and/or model. A dedicated hardware unit 336 may include, without limitation, a hardware unit that can perform iterative or massed calculations, such as matrix-based calculations to update or tune parameters, weights, coefficients, and/or biases of machine-learning models and/or neural networks, efficiently using pipelining, parallel processing, or the like; such a hardware unit may be optimized for such processes by, for instance, including dedicated circuitry for matrix and/or signal processing operations that includes, e.g., multiple arithmetic and/or logical circuit units such as multipliers and/or adders that can act simultaneously and/or in parallel or the like. Such dedicated hardware units 336 may include, without limitation, graphical processing units (GPUs), dedicated signal processing modules, FPGA or other reconfigurable hardware that has been configured to instantiate parallel processing units for one or more specific tasks, or the like, A computing device, processor, apparatus, or module may be configured to instruct one or more dedicated hardware units 336 to perform one or more operations described herein, such as evaluation of model and/or algorithm outputs, one-time or iterative updates to parameters, coefficients, weights, and/or biases, and/or any other operations such as vector and/or matrix operations as described in this disclosure.

Figure 4:
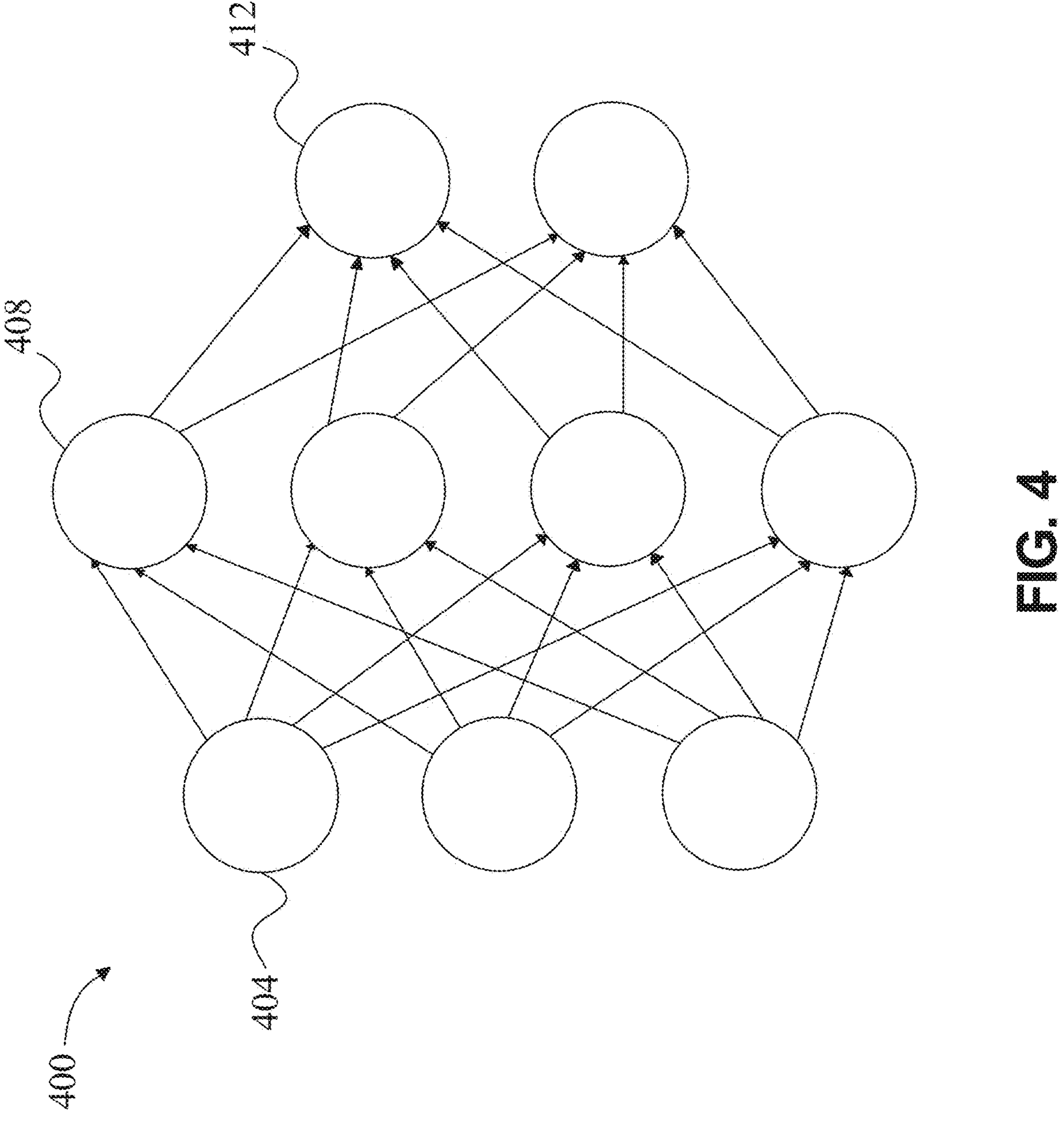
FIG. 4 illustrates a diagram of an exemplary neural network.

Referring now to FIG. 4, an exemplary embodiment of neural network 400 is illustrated. A neural network 400 also known as an artificial neural network, is a network of "nodes," or data structures having one or more inputs, one or more outputs, and a function determining outputs based on inputs. Such nodes may be organized in a network, such as without limitation a convolutional neural network, including an input layer of nodes 404, one or more intermediate layers 408, and an output layer of nodes 412. Connections between nodes may be created via the process of "training"

the network, in which elements from a training dataset are applied to the input nodes, a suitable training algorithm (such as Levenberg-Marquardt, conjugate gradient, simulated annealing, or other algorithms) is then used to adjust the connections and weights between nodes in adjacent layers of the neural network to produce the desired values at the output nodes. This process is sometimes referred to as deep learning. Connections may run solely from input nodes toward output nodes in a "feed-forward" network or may feed outputs of one layer back to inputs of the same or a different layer in a "recurrent network." As a further non-limiting example, a neural network may include a convolutional neural network comprising an input layer of nodes, one or more intermediate layers, and an output layer of nodes. A "convolutional neural network," as used in this disclosure, is a neural network in which at least one hidden layer is a convolutional layer that convolves inputs to that layer with a subset of inputs known as a "kernel," along with one or more additional layers such as pooling layers, fully connected layers, and the like.

Figure 5:
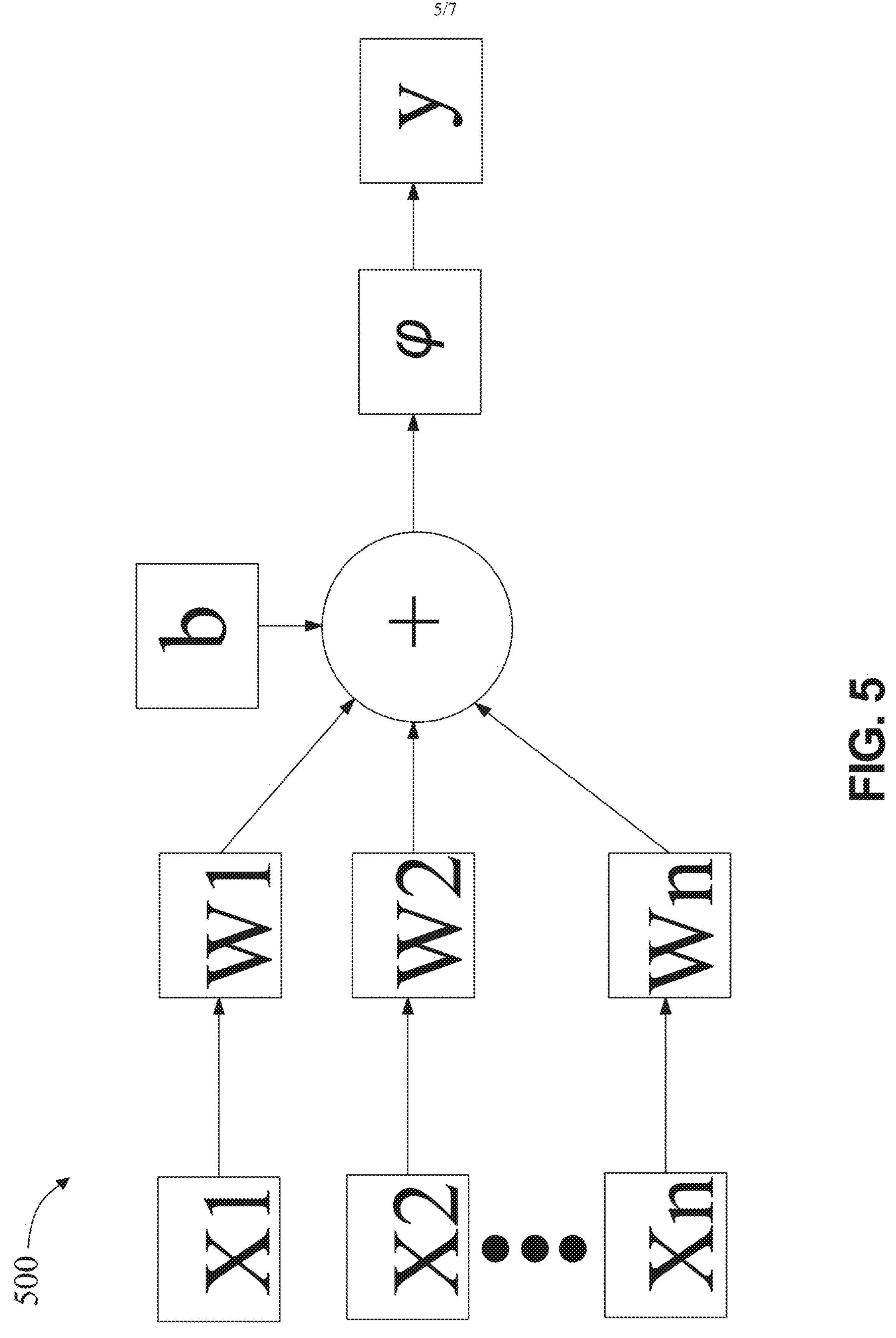
FIG. 5 illustrates a block diagram of an exemplary node in a neural network.

Referring now to FIG. 5, an exemplary embodiment of a node 500 of a neural network is illustrated. A node may include, without limitation, a plurality of inputs x; that may receive numerical values from inputs to a neural network containing the node and/or from other nodes. Node may perform one or more activation functions to produce its output given one or more inputs, such as without limitation computing a binary step function comparing an input to a threshold value and outputting either a logic 1 or logic 0 output or something equivalent, a linear activation function whereby an output is directly proportional to the input, and/or a non-linear activation function, wherein the output is not proportional to the input. Non-linear activation functions may include, without limitation, a sigmoid function of the form $$f(x) = \frac{1}{1 - e^{-x}}$$

given input x, a tanh (hyperbolic tangent) function, of the form $$\frac{e^x - e^{-x}}{e^x + e^{-x}},$$

a tanh derivative function such as $f(x)=\tanh^2(x)$, a rectified linear unit function such as $f(x)=\max(0, x)$, a "leaky" and/or "parametric" rectified linear unit function such as $f(x)=\max(ax, x)$ for some a, an exponential linear units function such as $$f(x) = \begin{cases} x \text{ for } x \geq 0 \\ \alpha(e^x - 1) \text{ for } x < 0 \end{cases}$$

for some value of α (this function may be replaced and/or weighted by its own derivative in some embodiments), a softmax function such as $$f(x_i) = \frac{e^x}{\sum_i x_i}$$

where the inputs to an instant layer are $x_i$, a swish function such as f(x)=x*sigmoid(x), a Gaussian error linear unit function such as $f(x)=a(1+\tanh(\sqrt{2/\pi}(x+bx^r)))$ for some values of a, b, and r, and/or a scaled exponential linear unit function such as $$f(x) = \lambda \begin{cases} \alpha(e^x - 1) \text{ for } x < 0 \\ x \text{ for } x \geq 0 \end{cases}.$$

Fundamentally, there is no limit to the nature of functions of inputs $x_i$ that may be used as activation functions. As a non-limiting and illustrative example, node may perform a weighted sum of inputs using weights $w_i$ that are multiplied by respective inputs $x_i$. Additionally or alternatively, a bias b may be added to the weighted sum of the inputs such that an offset is added to each unit in the neural network layer that is independent of the input to the layer. The weighted sum may then be input into a function φ, which may generate one or more outputs y. Weight $w_i$ applied to an input $x_i$ may indicate whether the input is "excitatory," indicating that it has strong influence on the one or more outputs y, for instance by the corresponding weight having a large numerical value, and/or a "inhibitory," indicating it has a weak effect influence on the one more inputs y, for instance by the corresponding weight having a small numerical value. The values of weights $w_i$, or of other coefficients and/or parameters of an activation function, may be determined by training a neural network using training data, which may be performed using any suitable process as described above. Each weight in a neural network may, without limitation, be updated and/or tuned, based on an error function J, using a backpropagation updating method, such as:

$$w_{new} = w_{old} - \alpha \frac{dJ}{dw}$$

where $w_{new}$ is the updated weight value, $w_{old}$ is the previous weight value, α is a parameter to set the learning rate, and $$\frac{dJ}{dw}$$

is the partial derivative of with respect to weight w.

Figure 6:
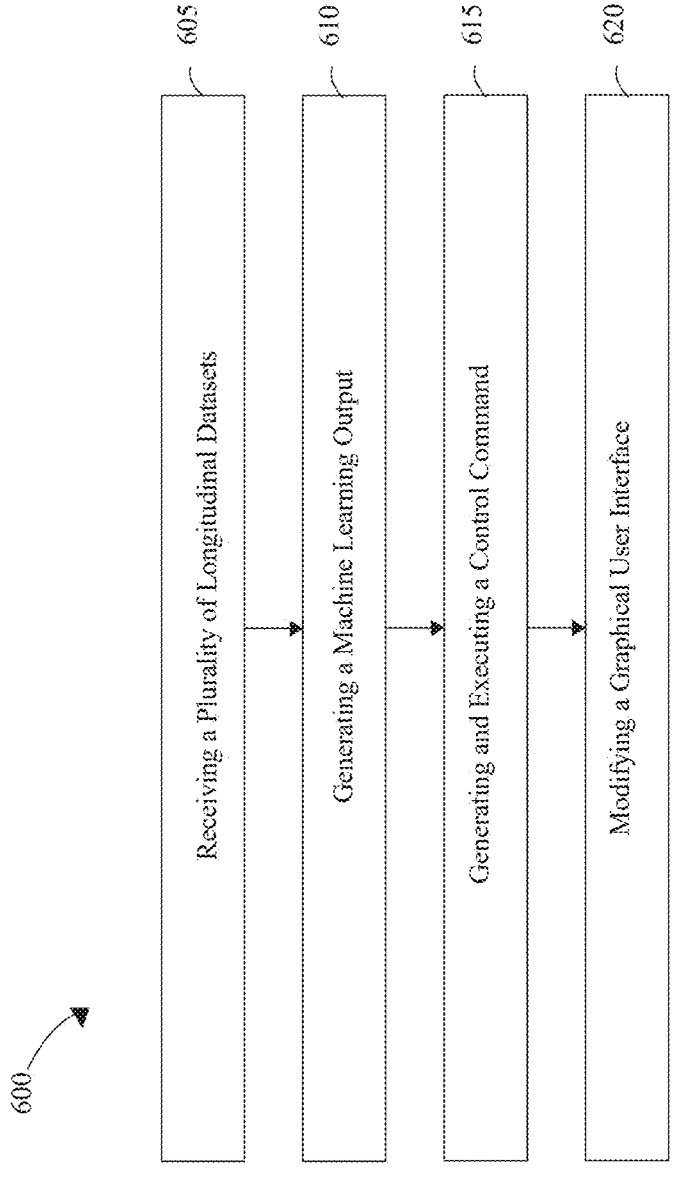
FIG. 6 illustrates a flow diagram of an exemplary method for automated generation of machine learning outputs for longitudinal datasets.

Referring now to FIG. 6, a flow diagram of an exemplary method 600 for automated generation of machine learning outputs for longitudinal datasets is illustrated. Method 600 contains a step 605 of receiving, using at least a processor, a plurality of longitudinal datasets, wherein the plurality of longitudinal datasets include a plurality of temporal data points. In some embodiments, receiving the plurality of longitudinal datasets may include temporally aligning the plurality of longitudinal datasets to a common time base, wherein the plurality of output machine-learning models are configured to receive input data aligned to the common time base. These may be implemented as reference to FIGS. 1-5.

With continued reference to FIG. 6, method 600 contains a step 610 of generating, using at least a processor, a machine learning output as a function of a plurality of longitudinal datasets using a plurality of output machine-learning models that has been trained on one or more output training datasets including exemplary longitudinal datasets correlated to exemplary machine learning outputs. In some embodiments, generating the machine learning output may include classifying the plurality of longitudinal datasets to one or more data cohorts as a function of metadata of the plurality of longitudinal datasets, and generating the machine learning output as a function of the one or more data cohorts. In some embodiments, generating the machine learning output may include segmenting the plurality of longitudinal datasets into a plurality of sequential analysis windows as a function of timestamps within the plurality of temporal data points, and generating the machine learning output in each of the plurality of sequential analysis windows. In some embodiments, generating the machine learning output may include selecting one output machine-learning model from the plurality of output machine-learning models for each of the plurality of sequential analysis windows, wherein each of the plurality of output machine-learning models has been trained on at least one output training dataset including historical data specific to a monitored parameter, and generating the machine learning output as a function of each of the plurality of sequential analysis windows and a corresponding monitored parameter using the selected output machine learning model. In some embodiments, generating the machine learning output may include identifying a temporal pattern within the plurality of longitudinal datasets as a function of a directional change of the plurality of temporal data points. In some embodiments, generating the machine learning output may include identifying at least an anomaly within the plurality of longitudinal datasets as a function of historical data, detecting a monitored parameter associated with the at least an anomaly, and generating and executing the control command as a function of the monitored parameter, wherein the control command may be configured to modify a sampling rate of at least one of the plurality of longitudinal datasets associated with the monitored parameter, wherein executing the control command may include disabling data sampling from a data source associated with the at least one of the plurality of longitudinal datasets. These may be implemented as reference to FIGS. 1-5.

With continued reference to FIG. 6, method 600 contains a step 615 of generating and executing, using at least a processor, a control command as a function of a machine learning output, wherein executing the control command includes selectively increasing an analysis frequency upon detecting a positive machine learning output, and selectively decreasing the analysis frequency upon detecting a negative machine learning output. In some embodiments, generating and executing the control command may include receiving each of the plurality of longitudinal datasets at a different sampling rate, and modifying the sampling rate of each of the plurality of longitudinal datasets as a function of the machine learning output. In some embodiments, modifying the sampling rate may include adjusting a first sampling rate of a first longitudinal dataset to an intermittent sampling mode, wherein the adjustment may reduce resource utilization for a portion of the plurality of longitudinal datasets, wherein the portion of the plurality of longitudinal datasets may include a monitored parameter identified as stable, and adjusting a second sampling rate of a second longitudinal dataset to a continuous sampling mode, wherein the adjustment may preserve forecasting accuracy for a portion of the plurality of longitudinal datasets, wherein the portion of the plurality of longitudinal datasets may include a monitored parameter identified as anomalous. These may be implemented as reference to FIGS. 1-5.

With continued reference to FIG. 6, method 600 contains a step 620 of modifying, using at least a processor, a graphical user interface as a function of a machine learning output. In some embodiments, modifying the graphical user interface may include rendering a plurality of disparate graphical elements as a function of the machine learning output, wherein each of the plurality of disparate graphical elements may be associated with a distinct classification of the machine learning output, and each of the plurality of disparate graphical elements may be configured to visually emphasize the distinct classification of the machine learning output. These may be implemented as reference to FIGS. 1-5.

It is to be noted that any one or more of the aspects and embodiments described herein may be conveniently implemented using one or more machines (e.g., one or more computing devices that are utilized as a user computing device for an electronic document, one or more server devices, such as a document server, etc.) programmed according to the teachings of the present specification, as will be apparent to those of ordinary skill in the computer art. Appropriate software coding can readily be prepared by skilled programmers based on the teachings of the present disclosure, as will be apparent to those of ordinary skill in the software art. Aspects and implementations discussed above employing software and/or software modules may also include appropriate hardware for assisting in the implementation of the machine executable instructions of the software and/or software module.

Such software may be a computer program product that employs a machine-readable storage medium. A machine-readable storage medium may be any medium that is capable of storing and/or encoding a sequence of instructions for execution by a machine (e.g., a computing device) and that causes the machine to perform any one of the methodologies and/or embodiments described herein. Examples of a machine-readable storage medium include, but are not limited to, a magnetic disk, an optical disc (e.g., CD, CD-R, DVD, DVD-R, etc.), a magneto-optical disk, a read-only memory "ROM" device, a random access memory "RAM" device, a magnetic card, an optical card, a solid-state memory device, an EPROM, an EEPROM, and any combinations thereof. A machine-readable medium, as used herein, is intended to include a single medium as well as a collection of physically separate media, such as, for example, a collection of compact discs or one or more hard disk drives in combination with a computer memory. As used herein, a machine-readable storage medium does not include transitory forms of signal transmission.

Such software may also include information (e.g., data) carried as a data signal on a data carrier, such as a carrier wave. For example, machine-executable information may be included as a data-carrying signal embodied in a data carrier in which the signal encodes a sequence of instruction, or portion thereof, for execution by a machine (e.g., a computing device) and any related information (e.g., data structures and data) that causes the machine to perform any one of the methodologies and/or embodiments described herein.

Examples of a computing device include, but are not limited to, an electronic book reading device, a computer workstation, a terminal computer, a server computer, a handheld device (e.g., a tablet computer, a smartphone, etc.), a web appliance, a network router, a network switch, a network bridge, any machine capable of executing a sequence of instructions that specify an action to be taken by that machine, and any combinations thereof. In one example, a computing device may include and/or be included in a kiosk.

Figure 7:
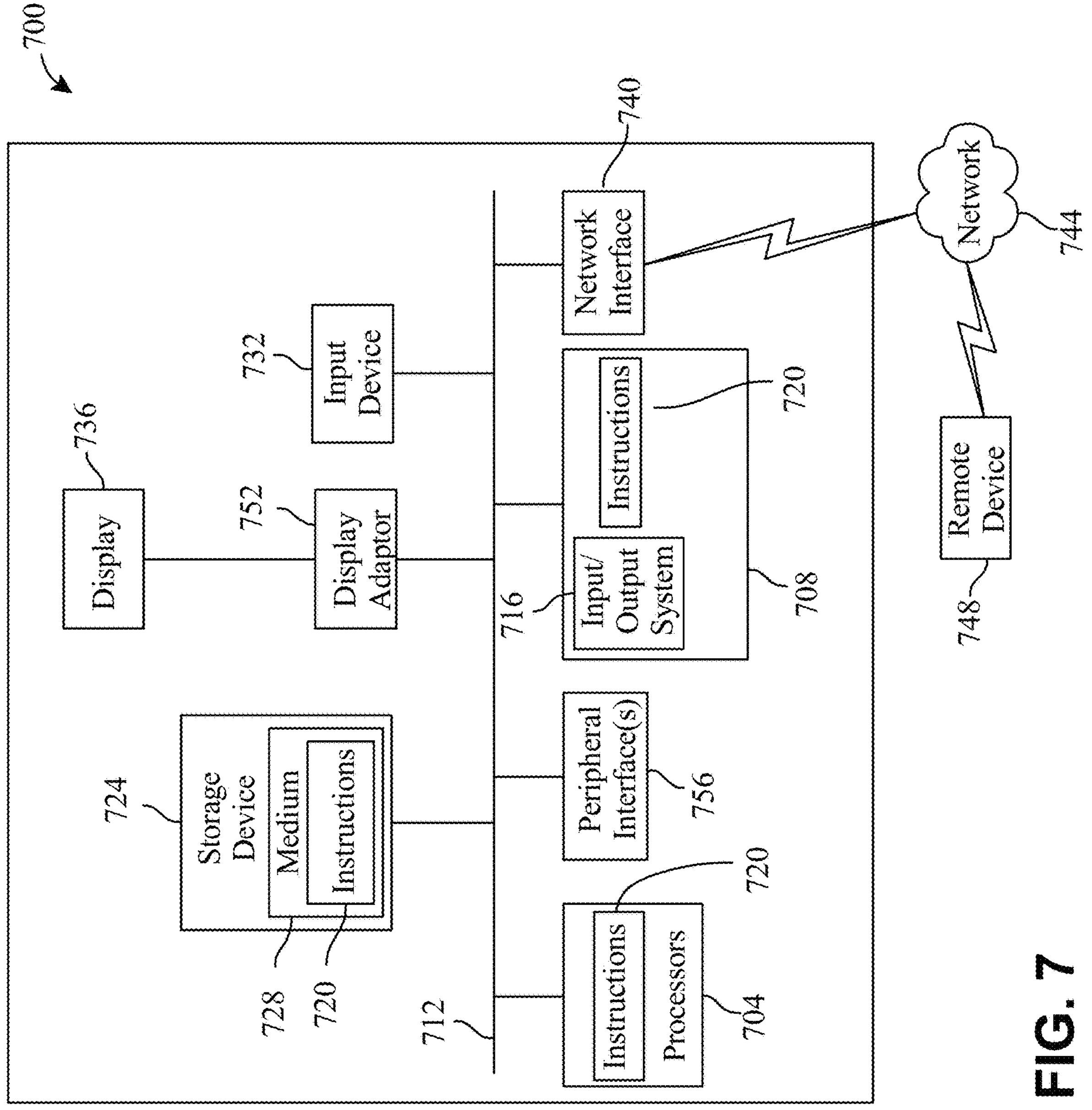
FIG. 7 illustrates a block diagram of a computing system that can be used to implement any one or more of the methodologies disclosed herein and any one or more portions thereof.

FIG. 7 shows a diagrammatic representation of one embodiment of a computing device in the exemplary form of a computer system 700 within which a set of instructions for causing a control system to perform any one or more of the aspects and/or methodologies of the present disclosure may be executed. It is also contemplated that multiple computing devices may be utilized to implement a specially configured set of instructions for causing one or more of the devices to perform any one or more of the aspects and/or methodologies of the present disclosure. Computer system 700 includes a processor 704 and a memory 708 that communicate with each other, and with other components, via a bus 712. Bus 712 may include any of several types of bus structures including, but not limited to, a memory bus, a memory controller, a peripheral bus, a local bus, and any combinations thereof, using any of a variety of bus architectures.

Processor 704 may include any suitable processor, such as without limitation a processor incorporating logical circuitry for performing arithmetic and logical operations, such as an arithmetic and logic unit (ALU), which may be regulated with a state machine and directed by operational inputs from memory and/or sensors; processor 704 may be organized according to Von Neumann and/or Harvard architecture as a non-limiting example. Processor 704 may include, incorporate, and/or be incorporated in, without limitation, a microcontroller, microprocessor, digital signal processor (DSP), Field Programmable Gate Array (FPGA), Complex Programmable Logic Device (CPLD), Graphical Processing Unit (GPU), general purpose GPU, Tensor Processing Unit (TPU), analog or mixed signal processor, Trusted Platform Module (TPM), a floating point unit (FPU), system on module (SOM), and/or system on a chip (SoC). Each processor and/or processor core may perform a state transition, instruction, and/or instruction step during a period of a "clock," or a regular oscillator that generates periodic output waveform, such as a square wave, having a regular period; different processors and/or cores may have distinct clocks. A processor may operate as and/or include a processing unit that performs instruction inputs, arithmetic operations, logical operations, memory retrieval operations, memory allocation operations, and/or input and output operations; a control circuit or module within a processor may determine which of the above-described functions a processor and/or unit within a processor will perform on a given clock cycle. A processor may include a plurality of processing units or "cores," each of which performs the above-described actions; multiple cores may work on disparate instruction sets and/or may work in parallel. A single core may also include multiple arithmetic, logic, or other units that can work in parallel with each other. Parallel computing between and/or within processors and/or cores may include multithreading processes and/or protocols such as without limitation Tomasulpo's algorithm. As used in this disclosure, "a processor," and/or "configuring a processor," is equivalent for the purposes of this disclosure to at least a processor, a plurality of processors, and/or a plurality of processor cores, and/or programming at least a processor, a plurality of processors, and/or a plurality of processor cores, which may be configured to operate on instructions in parallel and/or sequentially according to multithreading algorithms, parallel computing, load and/or task balancing, and/or virtualization, for instance and without limitation as described below.

Memory 708 may include various components (e.g., machine-readable media) including, but not limited to, a random-access memory component, a read only component, and any combinations thereof. In one example, a basic input/output system 716 (BIOS), including basic routines that help to transfer information between elements within computer system 700, such as during start-up, may be stored in memory 708. Memory 708 may also include (e.g., stored on one or more machine-readable media) instructions (e.g., software) 720 embodying any one or more of the aspects and/or methodologies of the present disclosure. In another example, memory 708 may further include any number of program modules including, but not limited to, an operating system, one or more application programs, other program modules, program data, and any combinations thereof. Memory 708 may include a primary memory and a secondary memory. "Primary memory," which may be implemented, without limitation as "random access memory" (RAM), is memory used for temporarily storing data for active use by a processor. In one or more embodiments, during use of the computing device, instructions and/or information may be transmitted to primary memory wherein information may be processed. In one or more embodiments, information may only be populated within primary memory while a particular software is running. In one or more embodiments, information within primary memory is wiped and/or removed after the computing device has been turned off and/or use of a software has been terminated. In one or more embodiments, primary memory may be referred to as "Volatile memory" wherein the volatile memory only holds information while data is being used and/or processed. In one or more embodiments, volatile memory may lose information after a loss of power.

Computer system 700 may also include a storage device 724. Examples of a storage device (e.g., storage device 724) include, but are not limited to, a hard disk drive, a magnetic disk drive, an optical disc drive in combination with an optical medium, a solid-state memory device, and any combinations thereof. Storage device 724 may be connected to bus 712 by an appropriate interface (not shown). Example interfaces include, but are not limited to, SCSI, advanced technology attachment (ATA), serial ATA, universal serial bus (USB), IEEE 1394 (FIREWIRE), and any combinations thereof. In one example, storage device 724 (or one or more components thereof) may be removably interfaced with computer system 700 (e.g., via an external port connector (not shown)). Particularly, storage device 724 and an associated machine-readable medium 728 may provide nonvolatile and/or volatile storage of machine-readable instructions, data structures, program modules, and/or other data for computer system 700. In some embodiments, storage device 724 and/or devices "Secondary memory" also known as "storage," "hard disk drive" and the like for the purposes of this disclosure is a long-term storage device in which an operating system and other information is stored; operating system and/or main program instructions may alternatively or additionally be stored in hard-coded memory ROM, or the like. In one or more remote embodiments, information may be retrieved from secondary memory and copied to primary memory during use. In one or more embodiments, secondary memory may be referred to as non-volatile memory wherein information is preserved even during a loss of power. In some embodiments, data from secondary memory is transferred to primary memory before being accessed by a processor. In one or more embodiments, data is transferred from secondary to primary memory wherein circuitry may access the information from primary memory. In one example, software 720 may reside, completely or partially, within machine-readable medium 728. In another example, software 720 may reside, completely or partially, within processor 704.

Computer system 700 may also include an input device 732. In one example, a user of computer system 700 may enter commands and/or other information into computer system 700 via input device 732. Examples of an input device 732 include, but are not limited to, an alpha-numeric input device (e.g., a keyboard), a pointing device, a joystick, a gamepad, an audio input device (e.g., a microphone, a voice response system, etc.), a cursor control device (e.g., a mouse), a touchpad, an optical scanner, a video capture device (e.g., a still camera, a video camera), a touchscreen, and any combinations thereof. Input device 732 may be interfaced to bus 712 via any of a variety of interfaces (not shown) including, but not limited to, a serial interface, a parallel interface, a game port, a USB interface, a FIREWIRE interface, a direct interface to bus 712, and any combinations thereof. Input device 732 may include a touch screen interface that may be a part of or separate from display 736, discussed further below. Input device 732 may be utilized as a user selection device for selecting one or more graphical representations in a graphical interface as described above.

A user may also input commands and/or other information to computer system 700 via storage device 724 (e.g., a removable disk drive, a flash drive, etc.) and/or network interface device 740. A network interface device, such as network interface device 740, may be utilized for connecting computer system 700 to one or more of a variety of networks, such as network 744, and one or more remote devices 748 connected thereto. Examples of a network interface device include, but are not limited to, a network interface card (e.g., a mobile network interface card, a LAN card), a modem, and any combination thereof. Examples of a network include, but are not limited to, a wide area network (e.g., the Internet, an enterprise network), a local area network (e.g., a network associated with an office, a building, a campus or other relatively small geographic space), a telephone network, a data network associated with a telephone/voice provider (e.g., a mobile communications provider data and/or voice network), a direct connection between two computing devices, and any combinations thereof. A network, such as network 744, may employ a wired and/or a wireless mode of communication. In general, any network topology may be used. Information (e.g., data, software 720, etc.) may be communicated to and/or from computer system 700 via network interface device 740.

Computer system 700 may further include a video display adapter 752 for communicating a displayable image to a display device, such as display 736. Examples of a display device include, but are not limited to, a liquid crystal display (LCD), a cathode ray tube (CRT), a plasma display, a light emitting diode (LED) display, and any combinations thereof. Display adapter 752 and display 736 may be utilized in combination with processor 704 to provide graphical representations of aspects of the present disclosure. In addition to a display device, computer system 700 may include one or more other peripheral output devices including, but not limited to, an audio speaker, a printer, and any combinations thereof. Such peripheral output devices may be connected to bus 712 via a peripheral interface 756. Examples of a peripheral interface include, but are not limited to, a serial port, a USB connection, a FIREWIRE connection, a parallel connection, and any combinations thereof.

Further referring to FIG. 7, a computing device may include any computing device as described in this disclosure, including without limitation a microcontroller, microprocessor, digital signal processor (DSP) and/or system on a chip (SoC) as described in this disclosure. A computing device may include, be included in, and/or communicate with a mobile device such as a mobile telephone or smartphone. A computing device may include a single device having components as described above operating independently or may include two or more such devices and/or components thereof operating in concert, in parallel, sequentially or the like; two or more devices, processors, memory elements, and the like may be included together in a single computing device or in two or more computing devices. A computing device may interface or communicate with one or more additional devices as described below in further detail via a network interface device.

In some embodiments, and still referring to FIG. 7, a computing device may be a component of a combination of at least a computing device; at least a computing device may include, as a non-limiting example, a first computing device or cluster of computing devices in a first location and a second computing device or cluster of computing devices in a second location. At least a computing device may include one or more computing devices dedicated to data storage, security, distribution of traffic for load balancing, and the like. At least a computing device may distribute one or more computing tasks as described below across a plurality of computing devices of computing device, which may operate in parallel, in series, redundantly, or in any other manner used for distribution of tasks or memory between computing devices. At least a computing device may be implemented, as a non-limiting example, using a "shared nothing" architecture.

With continued reference to FIG. 7, one or more programs or software instructions may include a principal program and/or operating system; principal program and/or operating system may be a program that runs automatically upon startup of a computing device and manages computer hardware and software resources. Principal program and/or operating system may include "startup," "loop," and/or "main" programs on a microcontroller; such programs may initialize hardware resources and subsequently iterate through a series of instructions to make function calls, read in data at input ports, output data at output ports, and process interrupts caused by asynchronous data inputs or the like. Principal program and/or operating system may include, without limitation, an operating system, which may schedule program tasks to be implemented by one or more processors, act as an intermediary between one or more programs and inputs, outputs, hardware and/or memory. Examples of operating systems include without limitation Unix, Linux, Microsoft Windows, Android, Disc Operating System (DOS) and the like. Operating systems may include, without limitation, multi-computer operating systems that run across multiple computing devices, real-time operating systems, and hypervisors. A "hypervisor," as used in this disclosure, is an operating system that runs a virtual machine and/or container, where virtual machines and/or containers create virtual interfaces for programs that mimic the behavior of hardware elements such as processors and/or memory; interactions with such virtual interfaces appear, to programs executed on virtual machines, to function as interactions with physical hardware, while in reality the hypervisor and/or programs such as containers (1) receive inputs from programs to the virtual resources and allocate such inputs to physical hardware that is not directly accessible to the programs, and (2) receive outputs from physical hardware and transmit such outputs to the programs in the form of apparent outputs from the virtual hardware. In some cases, one or more of computing system 700, processor 704, and memory 708 may be virtualized; that is, a virtual machine and/or container may interact directly with such computing system 700, processor 704, and/or memory 708, while managing communications therefrom and thereto via a virtual interface with programs. Computer virtualization may include dividing, or augmenting computing resources into a virtual machine, operating system, processor, and/or container. Virtualization of computer resources may be implemented through use of (1) multiple components, or portions thereof, working in concert, as if they were one unified (virtual) component; and/or (2) a portion of one or more components working as though it were a complete (virtual) component. For instance, where processor 704 comprises a plurality of processors and/or processor cores, virtualization may, in some cases, simulate or emulate a single (virtual) processor whose functions are allocated to one or more of the plurality of processors and/or processor cores. In this case, while processor 704 may be said to be virtualized, the processor 704, nevertheless, comprises actual hardware processor(s) or portion(s) thereof. Accordingly, in this disclosure, where a processor is said to perform instructions, such processor may comprise a virtualized processor, comprising a plurality or portion of hardware processors. Likewise, in this disclosure, where a memory is said to contain (i.e., store) instructions, such memory may comprise a virtualized memory, comprising a plurality or portion of memories. Technologies that enable such virtualization include (1) QEMU; (2) VMware by Broadcom Inc of Palo Alto, California; (3) VirtualBox by Oracle Corporation headquartered in Austin, Texas; and (4) kernel-based virtual machine (KVM).

The foregoing has been a detailed description of illustrative embodiments of the invention. Various modifications and additions can be made without departing from the spirit and scope of this invention. Features of each of the various embodiments described above may be combined with features of other described embodiments as appropriate in order to provide a multiplicity of feature combinations in associated new embodiments. Furthermore, while the foregoing describes a number of separate embodiments, what has been described herein is merely illustrative of the application of the principles of the present invention. Additionally, although particular methods herein may be illustrated and/or described as being performed in a specific order, the ordering is highly variable within ordinary skill to achieve methods and apparatuses according to the present disclosure. Accordingly, this description is meant to be taken only by way of example, and not to otherwise limit the scope of this invention.

Exemplary embodiments have been disclosed above and illustrated in the accompanying drawings. It will be understood by those skilled in the art that various changes, omissions and additions may be made to that which is specifically disclosed herein without departing from the spirit and scope of the present invention.

What is claimed is:

1. An apparatus for automated generation of machine learning outputs for longitudinal datasets, the apparatus comprising:

at least a processor; and a memory communicatively connected to the processor, wherein the memory contains instructions configuring the processor to:

receive from application programming interface a plurality of longitudinal datasets, wherein the plurality of longitudinal datasets comprises a plurality of temporal data points;

in response to the receiving of a plurality of longitudinal datasets:

temporally align the plurality of longitudinal datasets to a common time base;

segment the plurality of longitudinal datasets into a plurality of sequential analysis windows as a function of timestamps within the plurality of temporal data points, wherein the processor scans each longitudinal dataset of the longitudinal datasets that are scanned and the temporal data points are partitioned into time-aligned sequential analysis windows based on the timestamps;

automatically generate, in each sequential analysis window of the plurality of sequential analysis windows, a machine learning output as a function of the plurality of longitudinal datasets using a plurality of output machine-learning models that have been trained on one or more output training datasets comprising exemplary longitudinal datasets correlated to exemplary machine learning outputs;

automatically generate and execute a control command as a function of the machine learning output by sending a signal to a data ingestion module to reconfigure data acquisition policy, wherein executing the control command comprises:

selectively increasing an analysis frequency upon detecting a positive machine learning output; and selectively decreasing the analysis frequency upon detecting a negative machine learning output; and modify a graphical user interface of a computing device by rendering a plurality of disparate graphical elements as a function of the machine learning output, wherein the plurality of disparate graphical elements is configured to visually emphasize distinct classifications of the machine learning output.

2. The apparatus of claim 1, wherein receiving the plurality of longitudinal datasets comprises temporally aligning the plurality of longitudinal datasets to a common time base, wherein the plurality of output machine-learning models are configured to receive input data aligned to the common time base.

3. The apparatus of claim 1, wherein generating the machine learning output comprises:

classifying the plurality of longitudinal datasets to one or more data cohorts as a function of metadata of the plurality of longitudinal datasets; and generating the machine learning output as a function of the one or more data cohorts.

4. The apparatus of claim 1, wherein generating the machine learning output comprises:

selecting one output machine-learning model from the plurality of output machine-learning models for each sequential analysis window of the plurality of sequential analysis windows, wherein each output machine-learning model of the plurality of output machine-learning models has been trained on at least one output training dataset comprising historical data specific to a monitored parameter; and generating the machine learning output as a function of each sequential analysis window of the plurality of sequential analysis windows and a corresponding monitored parameter using the selected output machine learning model.

5. The apparatus of claim 1, wherein generating the machine learning output comprises identifying a temporal pattern within the plurality of longitudinal datasets as a function of a directional change of the plurality of temporal data points.

6. The apparatus of claim 1, wherein generating the machine learning output comprises:

identifying at least an anomaly within the plurality of longitudinal datasets as a function of historical data;

detecting a monitored parameter associated with the at least an anomaly; and generating and executing the control command as a function of the monitored parameter, wherein the control command is configured to modify a sampling rate of at least one of the plurality of longitudinal datasets associated with the monitored parameter, wherein executing the control command comprises:

disabling data sampling from a data source associated with the at least one of the plurality of longitudinal datasets.

7. The apparatus of claim 1, wherein generating and executing the control command comprises:

receiving each longitudinal dataset of the plurality of longitudinal datasets at a different sampling rate; and modifying the sampling rate of each longitudinal dataset of the plurality of longitudinal datasets as a function of the machine learning output.

8. The apparatus of claim 7, wherein modifying the sampling rate comprises:

adjusting a first sampling rate of a first longitudinal dataset to an intermittent sampling mode, wherein the adjustment reduces resource utilization for a portion of the plurality of longitudinal datasets, wherein the portion of the plurality of longitudinal datasets comprises a monitored parameter identified as stable; and adjusting a second sampling rate of a second longitudinal dataset to a continuous sampling mode, wherein the adjustment preserves forecasting accuracy for a portion of the plurality of longitudinal datasets, wherein the portion of the plurality of longitudinal datasets comprises a monitored parameter identified as anomalous.

9. The apparatus of claim 1, wherein modifying the graphical user interface comprises rendering a plurality of disparate graphical elements as a function of the machine learning output, wherein:

each disparate graphical element of the plurality of disparate graphical elements is associated with a distinct classification of the machine learning output; and each disparate graphical element of the plurality of disparate graphical elements is configured to visually emphasize the distinct classification of the machine learning output.

10. A method for automated generation of machine learning outputs for longitudinal datasets, the method comprising:

receiving, using at least a processor, from application programming interface, a plurality of longitudinal datasets, wherein the plurality of longitudinal datasets comprises a plurality of temporal data points;

in response to the receiving of a plurality of longitudinal datasets:

temporally aligning, using the at least a processor, the plurality of longitudinal datasets to a common time base;

segmenting, using the at least a processor, the plurality of longitudinal datasets into a plurality of sequential analysis windows as a function of timestamps within the plurality of temporal data points, wherein the processor scans each longitudinal dataset of the longitudinal datasets that are scanned and the temporal data points are partitioned into time-aligned sequential analysis windows based on the timestamps;

automatically generating, in each sequential analysis window of the plurality of sequential analysis windows, using the at least a processor, a machine learning output as a function of the plurality of longitudinal datasets using a plurality of output machine-learning models that have been trained on one or more output training datasets comprising exemplary longitudinal datasets correlated to exemplary machine learning outputs;

automatically generating and executing, using the at least a processor, a control command as a function of the machine learning output by sending a signal to a data ingestion module to reconfigure data acquisition policy, wherein executing the control command comprises:

selectively increasing an analysis frequency upon detecting a positive machine learning output; and selectively decreasing the analysis frequency upon detecting a negative machine learning output; and modifying, using the at least a processor, a graphical user interface of a computing device by rendering a plurality of disparate graphical elements as a function of the machine learning output, wherein the plurality of disparate graphical elements is configured to visually emphasize distinct classifications of the machine learning output.

11. The method of claim 10, wherein receiving the plurality of longitudinal datasets comprises temporally aligning the plurality of longitudinal datasets to a common time base, wherein the plurality of output machine-learning models are configured to receive input data aligned to the common time base.

12. The method of claim 10, wherein generating the machine learning output comprises:

classifying the plurality of longitudinal datasets to one or more data cohorts as a function of metadata of the plurality of longitudinal datasets; and generating the machine learning output as a function of the one or more data cohorts.

13. The method of claim 10, wherein generating the machine learning output comprises:

selecting one output machine-learning model from the plurality of output machine-learning models for each sequential analysis window of the plurality of sequential analysis windows, wherein each output machine-learning model of the plurality of output machine-learning models has been trained on at least one output training dataset comprising historical data specific to a monitored parameter; and generating the machine learning output as a function of each sequential analysis window of the plurality of sequential analysis windows and a corresponding monitored parameter using the selected output machine learning model.

14. The method of claim 10, wherein generating the machine learning output comprises identifying a temporal pattern within the plurality of longitudinal datasets as a function of a directional change of the plurality of temporal data points.

15. The method of claim 10, wherein generating the machine learning output comprises:

identifying at least an anomaly within the plurality of longitudinal datasets as a function of historical data;

detecting a monitored parameter associated with the at least an anomaly; and generating and executing the control command as a function of the monitored parameter, wherein the control command is configured to modify a sampling rate of at least one of the plurality of longitudinal datasets associated with the monitored parameter, wherein executing the control command comprises:

disabling data sampling from a data source associated with the at least one of the plurality of longitudinal datasets.

16. The method of claim 10, wherein generating and executing the control command comprises:

receiving each longitudinal dataset of the plurality of longitudinal datasets at a different sampling rate; and modifying the sampling rate of each longitudinal dataset of the plurality of longitudinal datasets as a function of the machine learning output.

17. The method of claim 16, wherein modifying the sampling rate comprises:

adjusting a first sampling rate of a first longitudinal dataset to an intermittent sampling mode, wherein the adjustment reduces resource utilization for a portion of the plurality of longitudinal datasets, wherein the portion of the plurality of longitudinal datasets comprises a monitored parameter identified as stable; and adjusting a second sampling rate of a second longitudinal dataset to a continuous sampling mode, wherein the adjustment preserves forecasting accuracy for a portion of the plurality of longitudinal datasets, wherein the portion of the plurality of longitudinal datasets comprises a monitored parameter identified as anomalous.

18. The method of claim 10, wherein modifying the graphical user interface comprises rendering a plurality of disparate graphical elements as a function of the machine learning output, wherein: each disparate graphical element of the plurality of disparate graphical elements is associated with a distinct classification of the machine learning output; and each disparate graphical element of the plurality of disparate graphical elements is configured to visually emphasize the distinct classification of the machine learning output.

* * * * *